(12) United States Patent
Sawyer et al.

(10) Patent No.: US 12,304,629 B2
(45) Date of Patent: May 20, 2025

(54) AERIAL FIRE-FIGHTING BUCKET SYSTEMS

(71) Applicant: KAWAK AVIATION TECHNOLOGIES, INC., Bend, OR (US)

(72) Inventors: Andrew Sawyer, Bend, OR (US); Steve Sawyer, Bend, OR (US); Jeremy Bryant, La Pine, OR (US); Scott Siemsen, La Pine, OR (US)

(73) Assignee: KAWAK AVIATION TECHNOLOGIES, INC., Bend, OR (US)

( * ) Notice: Subject to any disclaimer, the term of this patent is extended or adjusted under 35 U.S.C. 154(b) by 458 days.

(21) Appl. No.: 17/687,358

(22) Filed: Mar. 4, 2022

(65) Prior Publication Data

US 2023/0278708 A1    Sep. 7, 2023

(51) Int. Cl.
| | |
|---|---|
| *A62C 3/02* | (2006.01) |
| *B64D 1/16* | (2006.01) |
| *B64D 3/00* | (2006.01) |

(52) U.S. Cl.
CPC .............. *B64D 1/16* (2013.01); *A62C 3/0235* (2013.01); *B64D 3/00* (2013.01)

(58) Field of Classification Search
CPC ............ B64D 1/16; B64D 3/00; A62C 3/0235
USPC .......................................................... 169/53
See application file for complete search history.

(56) References Cited

U.S. PATENT DOCUMENTS

| | | | | |
|---|---|---|---|---|
| 3,572,441 | A * | 3/1971 | Nodegi ..................... | B64D 1/16 222/530 |
| 3,661,211 | A * | 5/1972 | Powers ..................... | B64D 1/16 169/53 |
| 3,710,868 | A * | 1/1973 | Chadwick ................ | B64D 1/16 169/53 |
| 4,474,245 | A * | 10/1984 | Arney ....................... | B64D 1/16 169/53 |
| 4,576,237 | A * | 3/1986 | Arney ....................... | A62C 8/02 169/53 |

(Continued)

OTHER PUBLICATIONS

U.S. Appl. No. 17/687,360, Non Final Office Action dated Oct. 12, 2023, 13 pages.

*Primary Examiner* — Chee-Chong Lee
(74) *Attorney, Agent, or Firm* — Leber IP Law; Celia H. Leber

(57) ABSTRACT

Aerial fire-fighting bucket systems are disclosed for liquid cargo pickup, transport, and discharge. Bucket systems include rigging to be attached to the long line of an aircraft, the bucket having a pliable skin having an upper edge and a lower edge, an upper frame from which the upper edge of the skin is suspended, and a lower structure to which the lower edge of the skin is attached in a sealed manner. Fixed attachment of the skin by its sealing attachment to the lower structure forms a container for the liquid cargo. Bucket systems include a valve system disposed in the lower structure and optionally a computer-controlled hydraulic motor/pump and accumulator configured to maintain hydraulic pressure, and controls to release liquid cargo from the bucket by a hydraulically-activated flapper valve assembly. Bucket systems may include a power fill system with pump having an outlet comprising a plurality of check valves.

19 Claims, 32 Drawing Sheets

(56) References Cited

U.S. PATENT DOCUMENTS

| | | | | |
|---|---|---|---|---|
| 5,560,429 A | * | 10/1996 | Needham | A62C 8/02 |
| | | | | 169/53 |
| 5,692,868 A | * | 12/1997 | Riemersma | B66C 1/226 |
| | | | | 414/403 |
| 5,829,809 A | | 11/1998 | Arney et al. | |
| 6,125,942 A | * | 10/2000 | Kaufman | A62C 3/0235 |
| | | | | 222/548 |
| 6,192,990 B1 | | 2/2001 | Brooke | |
| 7,182,145 B2 | | 2/2007 | Powers et al. | |
| 7,588,087 B2 | | 9/2009 | Cafferata | |
| 7,708,082 B2 | | 5/2010 | Hall et al. | |
| 8,453,753 B2 | | 6/2013 | Hall et al. | |
| 9,265,977 B2 | | 2/2016 | Toeckes et al. | |
| 9,914,000 B2 | | 3/2018 | Black | |
| 9,968,810 B2 | | 5/2018 | Doten | |
| 10,195,471 B2 | | 2/2019 | Doten | |
| 2013/0056230 A1 | | 3/2013 | Lemke et al. | |

\* cited by examiner

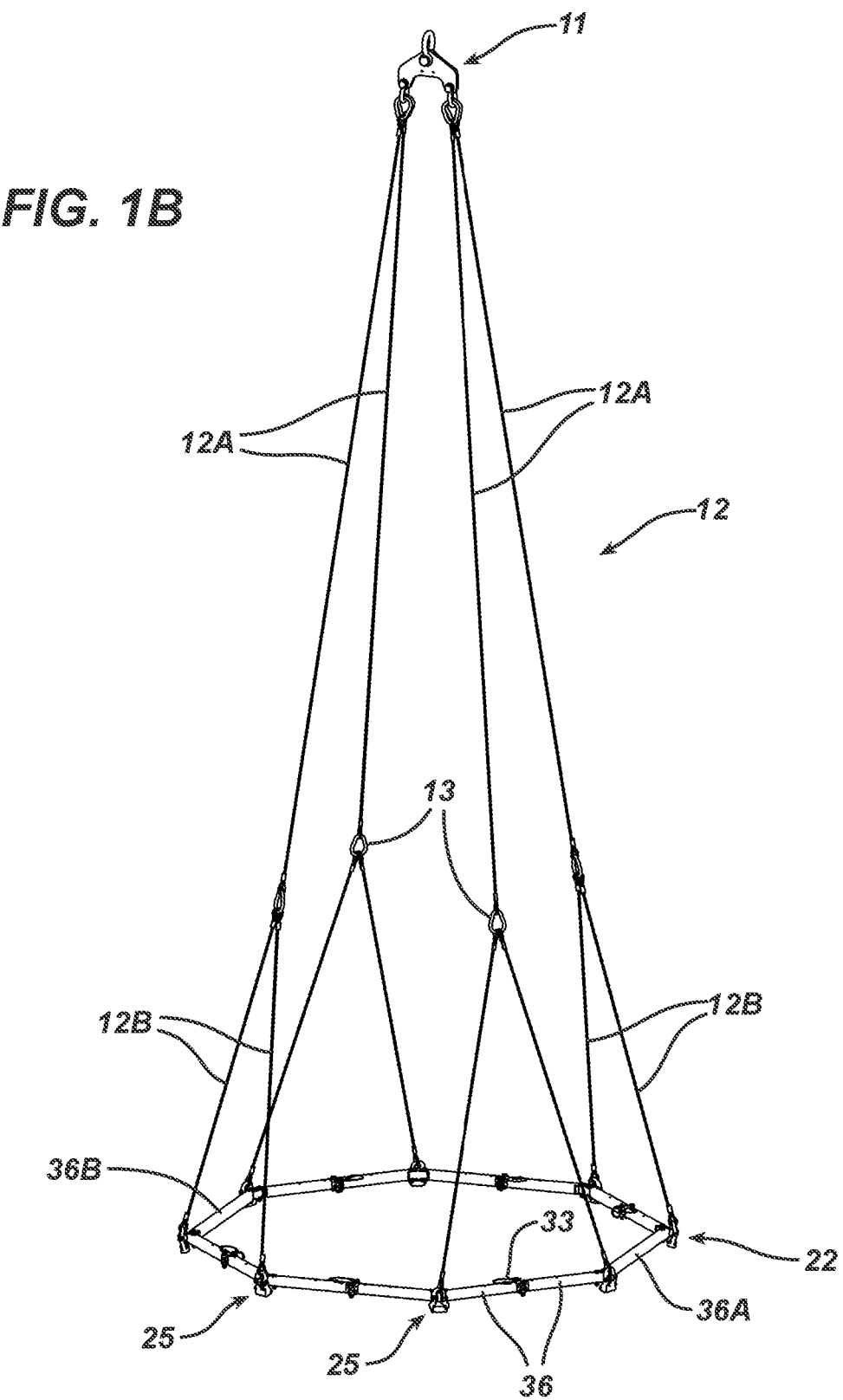

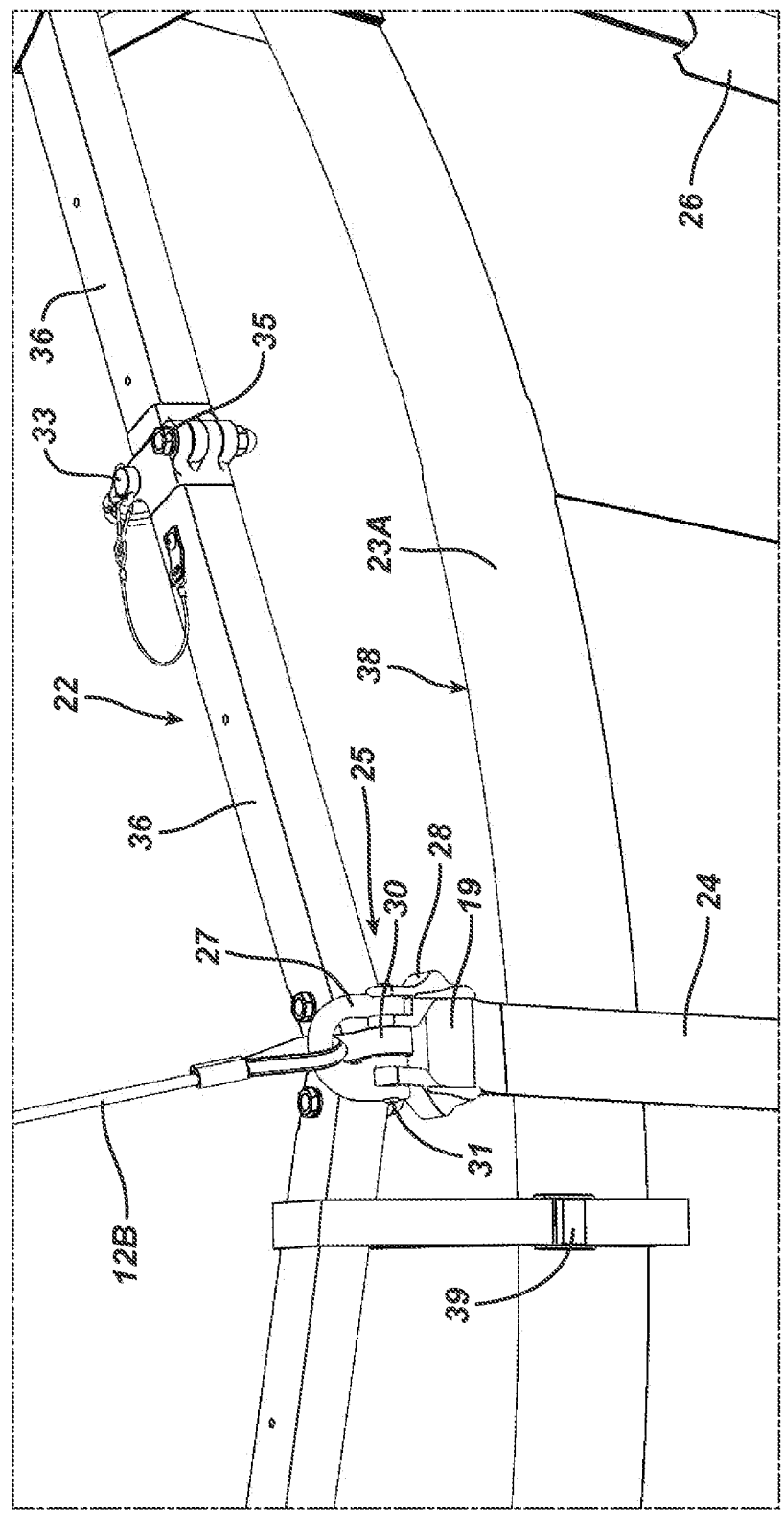

AERIAL FIRE-FIGHTING BUCKET SYSTEMS

BACKGROUND

Helicopters are commonly used to fight fires in remote locations, particularly on wildfires. Helicopters are used to drop water and chemical fire retardants on or near the fire. A bucket is suspended from the helicopter using a cargo line, the bucket is filled at remote water locations, and the contents are dropped on the fire, typically by opening a valve at the bottom of the bucket. All of these steps are accomplished without the need to land the helicopter.

Ideally, the bucket would be easily filled in both deep water sources, such as lakes, and shallow sources such as small ponds, streams, and rivers. However, this is not always the case due to a tendency for some buckets to deploy improperly when dipped in the water, and for the specialized power filling systems that are needed for shallow water sources to be unreliable in difficult conditions.

Other problems exist with many commercially available systems, including lack of durability and issues with actuation of the valve system that drops the bucket contents on the fire.

Durability and ease of maintenance are major issues, particularly due to the conditions to which buckets are subjected. Adverse conditions include very heavy loads (5000 pounds or more), load cycling as the bucket is repeatedly filled and its contents dumped (often up to 100 times in a day), hydraulic loading, movement of the bucket and its contents through the air during flight, abrasion as the bucket is dragged over the ground or through creek-side brush or trees, and exposure to temperature extremes and UV degradation.

Improvements to the hydraulic power and control systems over existing commercial systems are needed to reduce the burden of power supply cabling to the helicopter. Modularity and durability of the hydraulic power and valve actuation systems are needed to increase reliability and availability of the bucket systems.

SUMMARY

Aerial fire-fighting bucket systems are provided that can be suspended from a helicopter by a cargo line and used to deliver water to a fire, e.g., a wildfire, from a water source such as a lake, pond, river, or stream. In some implementations the systems include a bucket that is easily collapsible for storage and transport. The bucket is configured to be filled by dipping into a water source or, in some implementations, power filled via a pump in the bottom of the bucket. In some implementations, the bucket includes a pliable skin and a support structure in the form of a hinged framework. The framework may be configured to maintain the upper perimeter of the bucket in an open position for filling by dipping or side submersion. The bucket is designed to minimize loading of the skin to enhance durability of the skin and in some cases allow a relatively lightweight skin to be used. The bucket as a whole is designed to allow relative movement of its components in response to loading, to relieve the stress on components of the bucket.

In addition to water, the buckets may also be used to dispense retardant or other fire-fighting materials in liquid form. The contents of the bucket will be referred to as "water" herein for the sake of simplicity.

In one aspect, the disclosure features an aerial fire-fighting bucket system comprising a bucket configured to be filled with a liquid cargo and to discharge the liquid cargo and rigging attached to the bucket and configured to be attached to the long line of an aircraft. The bucket includes a pliable skin having an upper edge and a lower edge, an upper frame from which the upper edge of the skin is suspended, and a lower structure to which the lower edge of the skin is attached in a sealed manner. The only fixed attachment of the skin is its sealing attachment to the lower structure.

Some implementations may include one or more of the following features:

The upper edge of the skin is suspended from the upper frame by a plurality of loops, allowing the upper edge to move relative to the upper frame. The skin includes a plurality of sleeves disposed on an outer surface of the skin, and the bucket further includes a plurality of vertical load straps that are fixedly attached to the upper frame and the lower structure and extend through the sleeves such that they are slidable relative to the skin. The vertical load straps are formed of webbing. Alternatively, or in addition, the loops include a flexible strap and a buckle configured to allow a user to remove the skin from the upper frame. The rigging comprises a plurality of cables having lower ends, and the vertical load straps are attached to the lower ends of the cables by pivoting knuckle joints. Each knuckle joint comprises an upper shackle configured to be attached to the lower end of the cable, a lower connector configured to be attached to an upper end of one of the vertical load straps, and a pin connecting the upper shackle and lower connector. Removable knuckle joint covers are configured to protect the knuckle joints from abrasion. Further to the first aspect, the lower edge of the skin is attached to the lower structure using a band clamp, thereby allowing removal of the skin from the lower structure by a user.

In a second aspect, the disclosure features an aerial fire-fighting bucket system comprising a bucket configured to be filled with a liquid cargo and to discharge the liquid cargo, the bucket comprising a pliable skin and a lower structure that together form a container for the liquid cargo, rigging attached to the bucket and configured to be attached to the long line of an aircraft, and a valve system disposed in the lower structure and configured to release the liquid cargo from the bucket, the valve system comprising a hydraulically activated flapper valve assembly.

Some implementations of the second aspect may include one or more of the following features:

The flapper valve assembly comprises a circular valve plate having a pair of semi-circular flapper valve plates separated by a central generally rectangular support plate. Each flapper valve plate includes an inner portion and an outer portion, separated by an outer flexible hinge, and an inner flexible hinge is provided between inner edges of the flapper valve plates and the central support plate. Alternatively, or in addition, the valve plate includes an elastomeric gasket layer interposed between upper and lower portions of the flapper valve plates, the elastomeric gasket layer defining the inner and outer flexible hinges about which the inner and outer portions of the flapper valve plates pivot during actuation of the valve. The bucket system further comprises a hydraulic actuator assembly including a hydraulic piston operatively connected to the flapper valve plates. The hydraulic piston is connected to the flapper valve plates by a pair of elongated arms, each arm terminating in a dog link.

In a third aspect, the disclosure features an aerial fire-fighting bucket system comprising a bucket configured to be filled with a liquid cargo and to discharge the liquid cargo, the bucket comprising a pliable skin and a lower structure that together form a container for the liquid cargo, rigging attached to the bucket and configured to be attached to the long line of an aircraft, and a power fill system including a pump having an outlet comprising a plurality of check valves.

Some implementations may include one or more of the following features:

The power-fill check valves are arranged around a generally square water outlet at the upper end of the pump and are mounted on the water outlet to hinge upward from a closed position to a raised, open position. Four power-fill check valves arranged and configured such that when the power-fill check valves are in an open position, the outer edges of the power-fill check valves together define a square centered on an axis of the pump. The outlet is configured to deliver water from the pump in a 360 degree pattern. The bucket system further comprises a motor mounted coaxially with the pump.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DESCRIPTION OF THE DRAWINGS

FIG. 1B is a perspective view of the rigging and upper frame of the bucket system shown in FIG. 1.

FIG. 3A is an enlarged partial view of FIG. 3, showing details of the upper frame and attachments to the upper frame.

DETAILED DESCRIPTION

Figure 1:
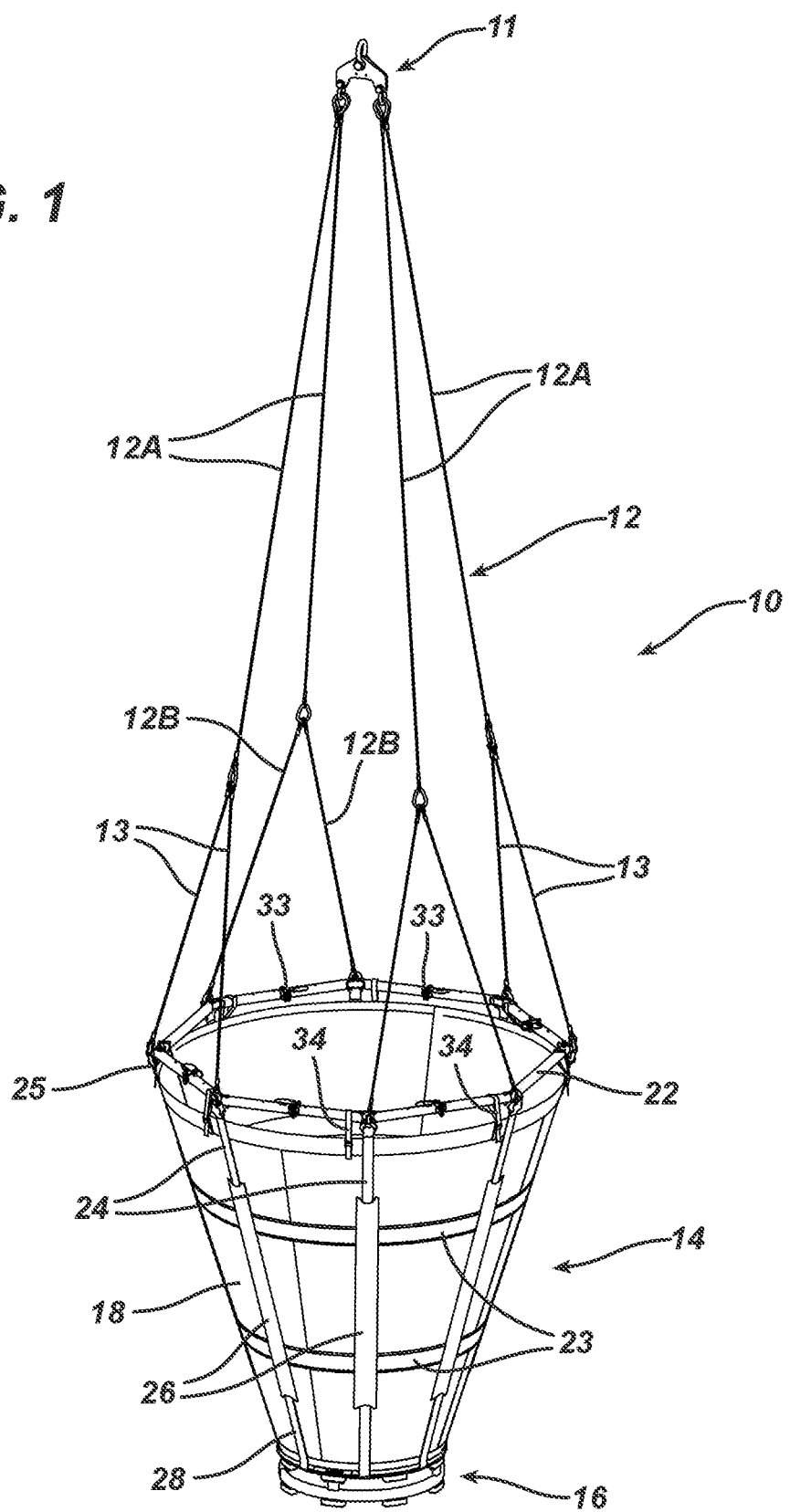
FIG. 1 is a perspective view of an aerial fire-fighting bucket system according to one implementation.

Referring to FIG. 1, an aerial fire-fighting bucket system 10 includes a plurality of rigging cables 12 terminating in a top yoke/shackle 11, a bucket 14, and a lower structure 16. The rigging cables 12 and top yoke/shackle 11 serve to suspend the bucket from a cargo line of an aircraft (e.g., a helicopter), with the top yoke/shackle 11 connecting to the long line hook of the aircraft and the lower ends of the rigging cables 12 being connected to an upper frame 22 of the bucket 14. Referring to FIG. 1B, rigging cables 12 include a plurality of upper cables 12A, each of which branches into two lower cables 12B. The upper cables 12A and lower cables 12B may be connected using rigging rings 13, to equalize the load and provide necessary movement during use.

The lower structure 16 includes valving to empty the bucket and in some cases supports other optional components within the bucket that provide power filling and supply power to the electrical systems of the bucket system, as will be discussed in detail below.

Bucket Structure

The bucket 14 includes a pliable skin 18, an upper frame 22 and a plurality of flexible vertical load straps (e.g., of webbing material) extending downwardly from the upper frame. The bucket 14 is designed so that the weight of the water will be transferred to the pliable skin 18 and frame 22, and from there to the rigging 12. As will be explained in detail below, the skin is suspended from the upper frame 22 with sliding loops, and is constrained only at its lower edge, where it is sealed to the lower structure to form a sealed container for the water.

The upper frame 22 holds the mouth of the skin open but does not hold the upper edge of the skin fixedly in place. Nor are there any points of attachment that force the skin into a predetermined shape or cause it to extend downwardly. The skin only extends downwardly from the upper frame 22 due to gravity (the weight of the skin itself). There is no rigid framework used to maintain the shape of the bucket. Because of this arrangement, stress concentrations on the skin are minimized. Such stress concentrations can lead to deterioration, wear and eventually leakage of the skin as the skin is subjected to load cycling during use and thus minimizing them will tend to increase the useful life of the skin, the most expensive and difficult to replace component of the bucket.

Figure 2:
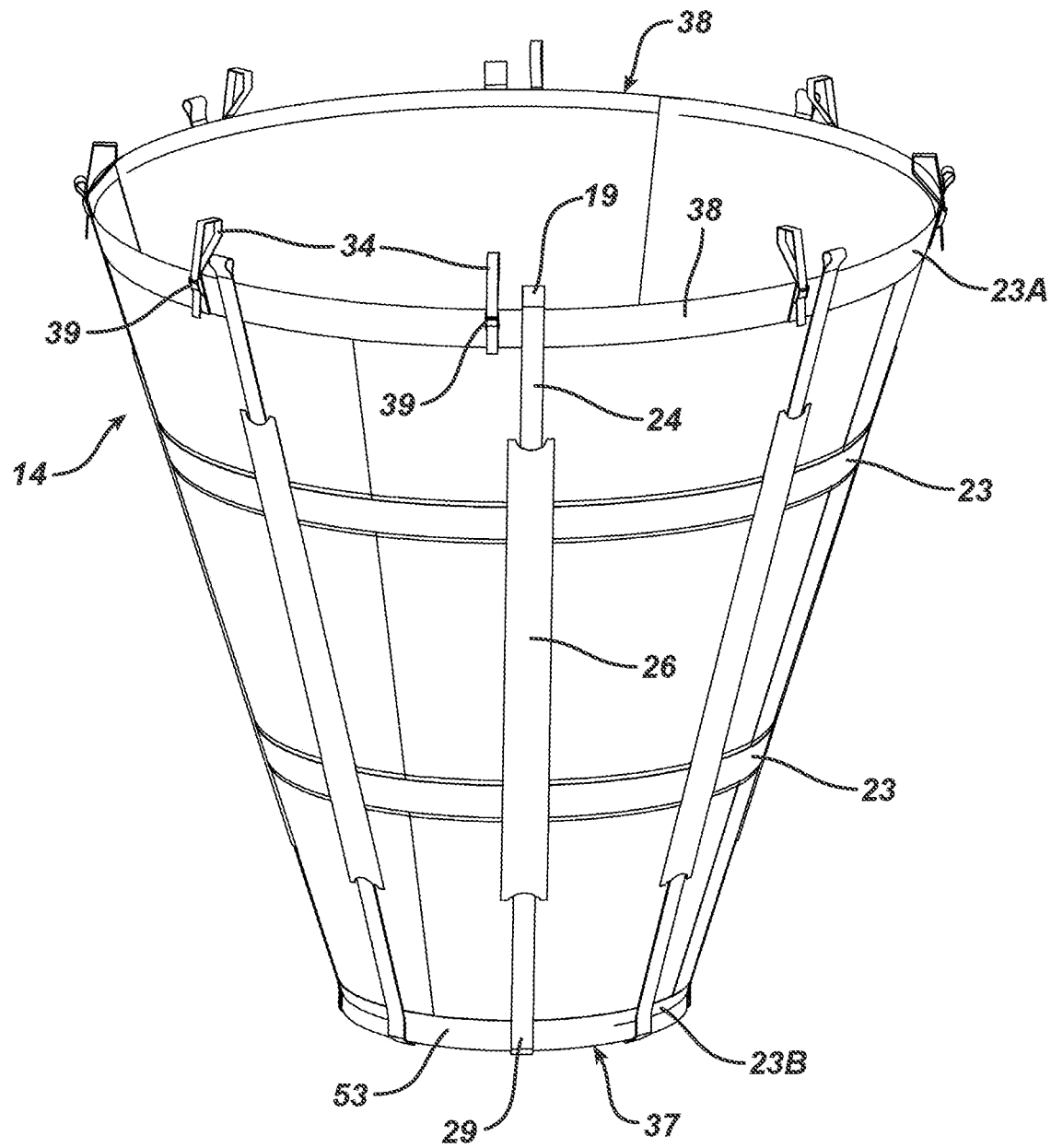
FIG. 2 is a larger perspective view of the bucket shown in FIG. 1 with the rigging, upper frame and lower structure removed.
Figure 2A:
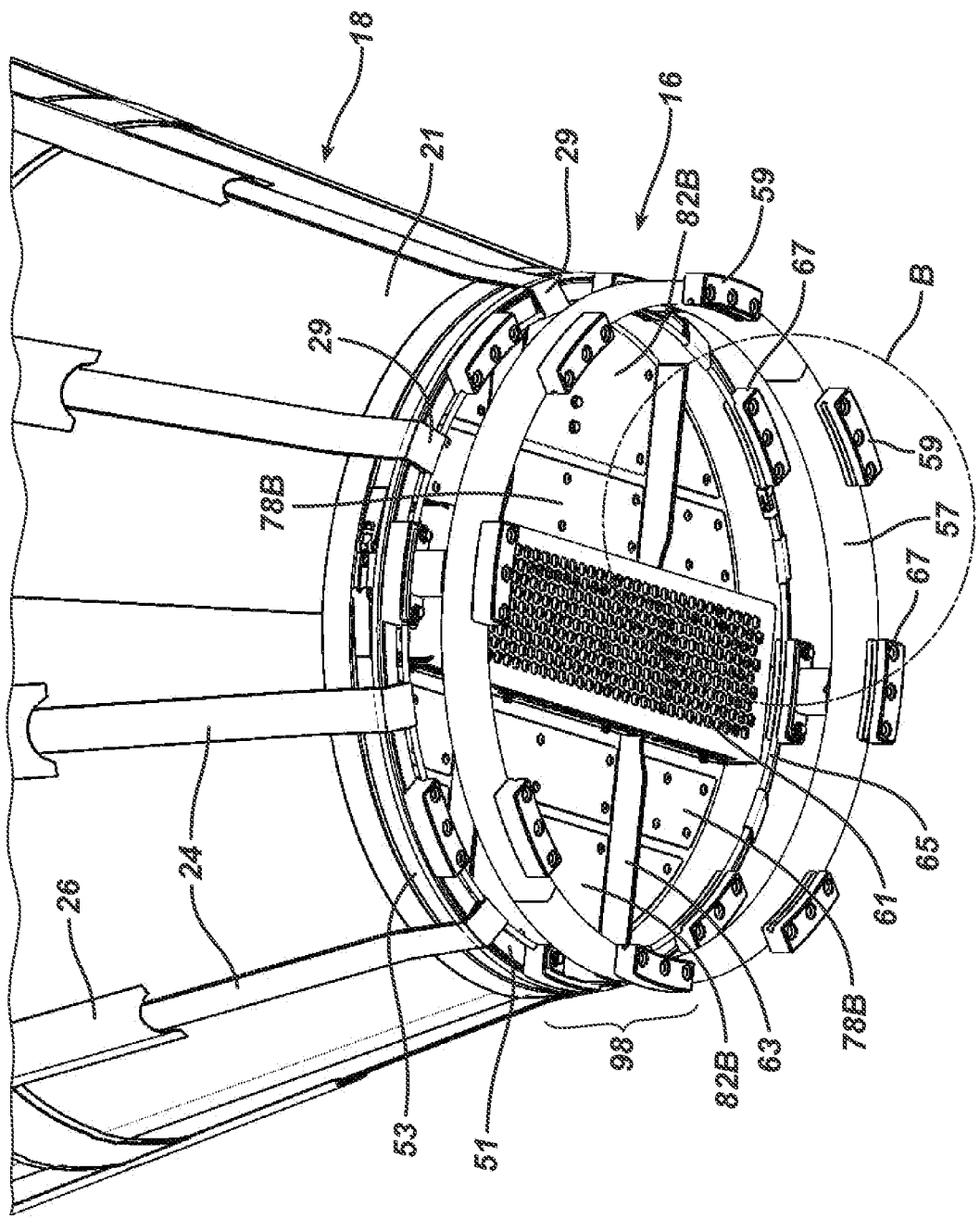
FIG. 2A is a detail view showing the attachment of the skin and vertical load straps to the lower structure of the bucket.

The skin 18 is shown in detail in FIGS. 2 and 2A. Skin 18 includes a main body 21, circumferentially extending sewn and/or welded reinforcing strips 23, and vertically extending sleeves 26. The reinforcing strips 23 help to maintain the shape of the skin within the vertical load straps, reducing outward bulging of the skin under load and allowing a thinner skin body to be used. The upper edge 38 and lower edge 37 of the skin include reinforcing strips 23A and 23B as well, to enhance durability and facilitate connection of the upper edge to the support structure and the lower edge to the lower structure 16. The body may be formed by joining a flat pattern of sheet material with seams, as is well known in the art. The reinforcing strips 23 and 23B and the sleeves 26 are generally formed of the same material as the skin, providing an extra layer of material. The reinforcing strip 23A at the upper edge 38 of the skin is formed of an abrasion resistant, tough ripstop fabric such as CORDURA® fabric, or can be formed by abrasion resistant coatings such as spray-on Speedliner® coatings.

Referring to FIG. 2A, the lower edge 37 (FIG. 2) of skin 18 is mounted on an upper base ring 51 of the lower structure 16 in a water-tight manner by a band clamp 53, forming a container for the water. As noted above, this is the only fixed attachment of the skin to another component of the bucket system. The attachment of the lower edge of the skin is shown in detail in FIG. 2C. To help locate the band clamp on the upper base ring 51, circular metal rings 62A, 62B are welded to the outer surface of the tubular steel base ring 51 near the upper and lower edges, respectively, of its outward-facing surface. The circular metal rings 62A, 62B, in combination with the outward-facing surface of the base ring 51, form a groove configured to receive and locate the lower edge 37 of the skin, the band clamp 53, and several other layers. A rubber extrusion layer 64 is mounted on the outward-facing surface, e.g., with marine adhesive, to cushion the interface between the base ring 51 and the inner surface of the skin and enhance water-tight sealing. A band clamp cushion 66 is provided between the outer surface of the skin and the band clamp 53, also to protect the skin surface and enhance sealing. The band clamp cushion 66 is a separate part that is applied immediately prior to tightening of the band clamp, and may be in the form of a long strip of material with ridges 68 to help locate the band on the band clamp cushion. Together, these layers provide a secure, water-tight seal between the lower edge of the skin and the lower structure of the bucket, with the band clamp compressing the layers together and against the base ring 51. The band clamp is not subjected to any significant load, as the weight of the lower structure is carried by the vertical load straps 24 as will be discussed further below.

Figure 3:
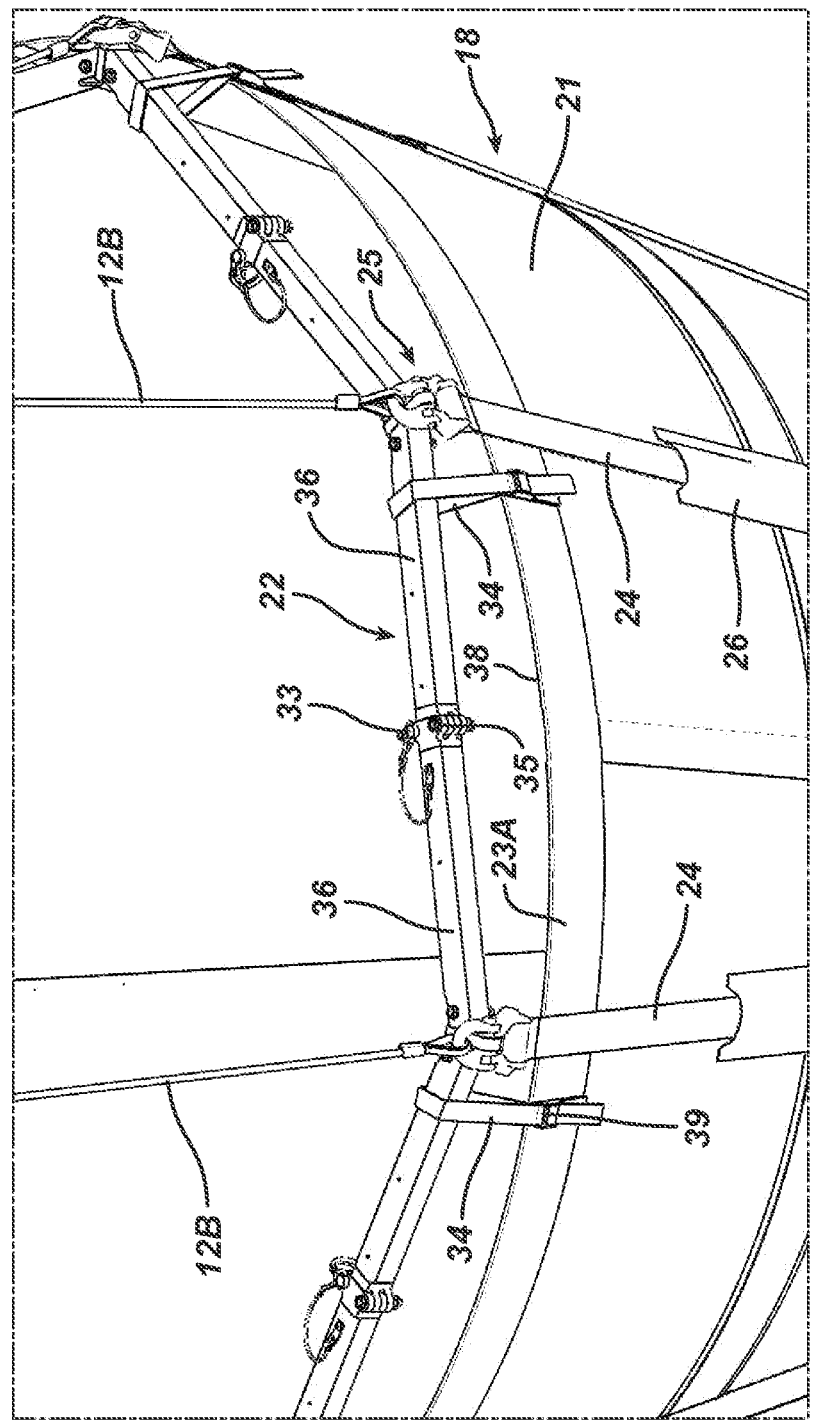
FIG. 3 is a detail view showing the attachment of the skin and vertical load straps to the upper frame with protective knuckle covers removed.

As shown in FIG. 3, the upper edge 38 of the skin 18 is suspended from the upper frame 22 by a plurality of webbing loops 34 spaced around the upper edge 38 as shown in FIG. 2. Loops 34 keep the skin from falling down and position it on the frame so that the mouth of the bucket stays open. The loops provide a sliding connection that allows the skin to move as needed in response to forces applied to the bucket. The skin may be formed of any of the materials conventionally used in fire-fighting buckets, or other suitable materials; to minimize weight a urethane-coated fabric may be used having a weight of less than 100 oz/yard$^2$, for example less than 70 oz/yard$^2$ and in some cases less than 50 oz/yard$^2$.

The skin can be easily removed from the other components of the system, e.g., for replacement due to damage, simply by undoing buckles 39 (FIG. 3A) that secure loops 34, unthreading the vertical load straps 24 from sleeves 26, and unfastening band clamp 53 (FIG. 2A). The replacement skin can then be assembled in the reverse order and the removed skin can then be rolled up for transport to maintenance and/or storage.

Figure 3B:
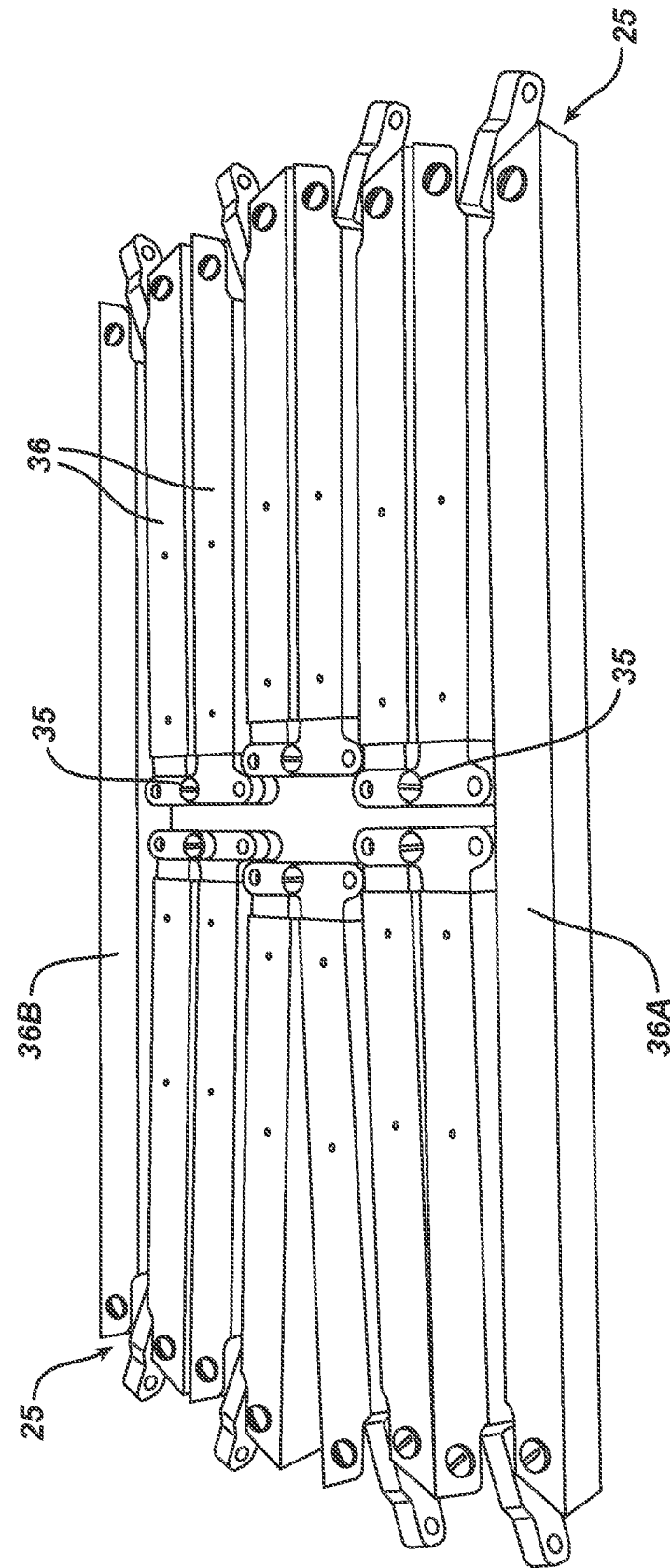
FIG. 3B is a perspective view showing the upper frame in a folded position with the other bucket features removed for clarity.

Referring to FIG. 3A, the upper frame 22 is formed of a plurality of elongated rigid members 36 that are pinned together with removable pins 33 and adjacent fixed pins 35. The elongated members 36 hinge about the fixed pins 35 when removable pins 33 are removed. As a result, the upper frame 22 can be easily folded into a compact form, shown in FIG. 3B, for storage and transport. The user is aided in folding the frame correctly (to achieve the compact shape shown in FIG. 3B) by the two continuous elongated members 36A, 36B that are disposed at opposite ends of the deployed frame 22 (FIG. 1B). When the frame is folded as shown in FIG. 3B, the knuckle joints 25 (the attachment points of the vertical load straps, as will be discussed below) are positioned on the outside and the fixed pins 35 are positioned on the inside. This is a preferred arrangement because the vertical load straps 24 will be on the outside of the folded frame, facilitating rolling the frame 22 up into the skin. The frame can be folded without having to lift or maneuver the bulky skin, simply by removing the pins 33. Once the frame is folded (and other steps have been taken like removing and coiling the rigging cables and removing the pump assembly) the inlet frame and rigging cables can be rolled into the skin and the rolled-up skin can be strapped to the lower structure 16 if desired.

Hinging the rigid members 36 about the fixed pins 35, as shown in FIGS. 3A and 3B, also prevents the elongated rigid members 36 from being dropped or lost during disassembly of the bucket for storage. In some cases, the rigid members 36 are formed of tubular metal, e.g., stainless steel, to provide good strength and durability while still minimizing the weight of the frame 22.

Referring again to FIG. 3A, the upper ends 19 of the load straps 24 are joined to the frame 22 by knuckle joints 25. Each knuckle joint 25 includes an upper shackle 27 to which the lower rigging cable 12B is attached, a lower connector 28 to which the upper end 19 of the vertical load strap 24 is attached (e.g., with a sewn loop), and a stabilizing lug 30 that is mounted between two adjacent rigid members 36 and serves to hold the knuckle joint in position on the upper frame 22. The upper shackle 27 and lower connector 28 are pinned together with a pin 31, allowing both the upper shackle 27 and lower connector 28 to pivot independently about the axis of the pin 31. This movement relieves stress imparted by movement of the bucket and resultant sloshing of the contents during use. A portion of the load from water weight is transmitted directly from the lower structure 16 to the vertical load strap 24, then to the lower connector and thence to the upper shackle portion via the pin 31 and from there directly to the lower rigging cable 12B. The remainder of the water weight is supported by the pliable skin 18, which transfers it to the loops 34, then to the rigid arms 36 of the inlet frame. From there, the load is transferred to the lower rigging cable 12B after passing through the stabilizing lug 30, the shackle pin 31, and the joint upper shackle 27.

The upper ends of the vertical load straps 24 can be easily detached from the knuckle joints by knocking out the pins 31, which include a roll-pin functionality allowing them to be removed with a hammer and shive. This, along with other features discussed herein, allows easy replacement of individual vertical load straps as they become damaged, or as part of routine maintenance.

Figure 1A:
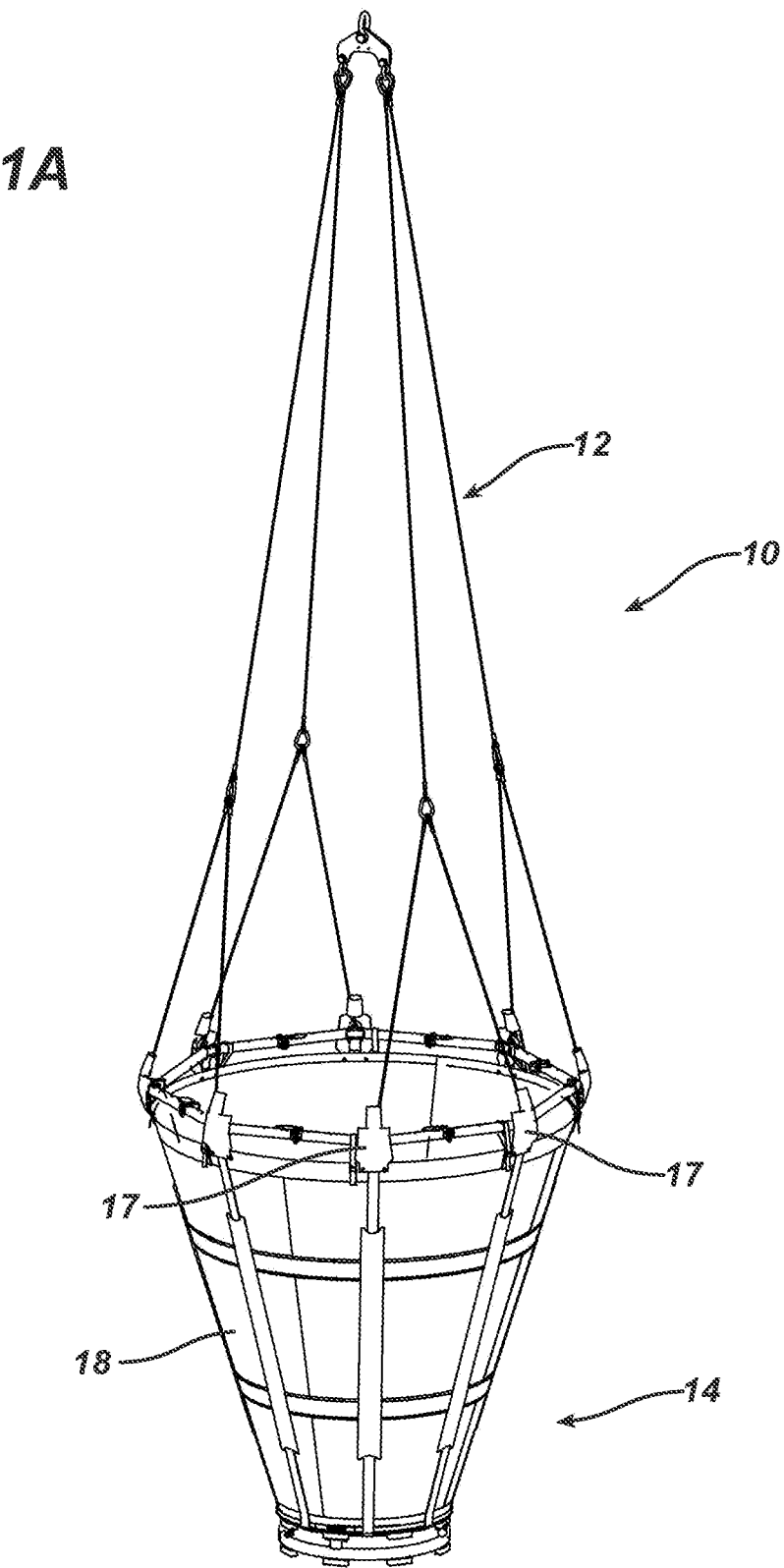
FIG. 1A is a perspective view similar to FIG. 1, showing knuckle joint covers in place on the bucket.

Referring to FIG. 1A, removable knuckle joint covers 17 may be provided over the knuckle joints to protect the knuckle joints from damage and wear as well as preventing the knuckle joints from causing damage or wear when rolling up the skin as described above. For example, the knuckle joint covers may be formed of a durable ripstop material and removably attached via hook and loop fastener material.

The vertical load straps 24 extend downwardly from the knuckle joints 25, as shown in FIG. 3, and are disposed within the sleeves 26 on the outer surface of the skin 18. The sleeves 26 position the vertical load straps and maintain their orientation, while still allowing sliding movement of the vertical load straps relative to the skin and thus avoiding the stress concentrations that would result from fixed attachment.

Figure 2B:
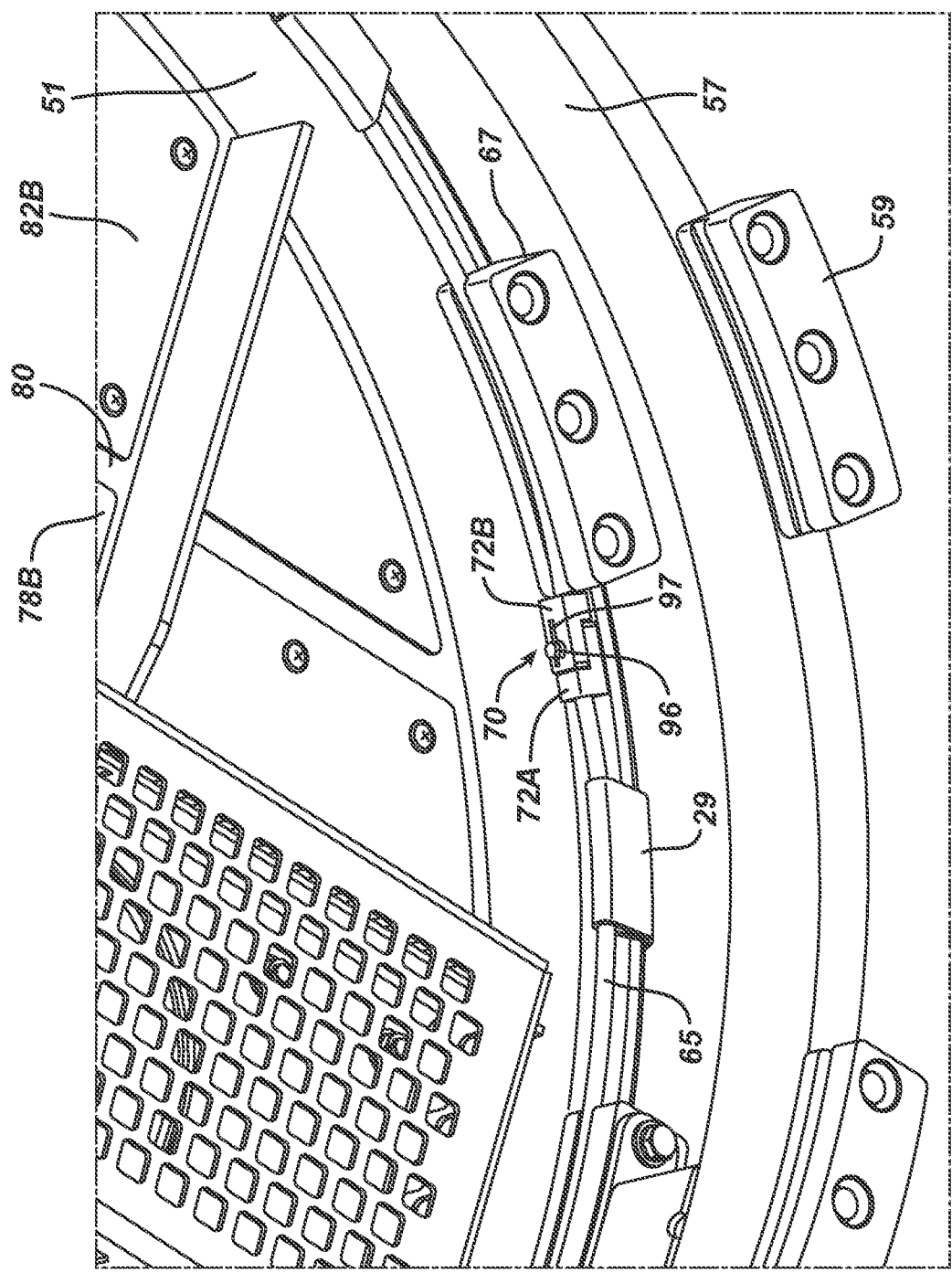
FIG. 2B is an enlarged detail view of area B in FIG. 2A, showing details of the vertical load strap attachment.

As shown in FIG. 2A, the looped lower ends 29 of the vertical load straps 24 are joined to the lower structure 16 by attaching them to a circular load strap rail 65 as will be described below. The load strap rail 65 is formed of a rigid material, e.g., stainless steel, and is held in place by positioning the rail in inward-facing grooves of a plurality of circularly arranged bearing pads 67. As shown in more detail in FIG. 2B, the load strap rail is a circular cross-section rod that is bent into a circle and pinned in place at the junction 70 of its ends. The junction 70 consists of two joining blocks 72A, 72B that are releasably connected by a clevis pin 96. Clevis pin 96 can be held in place, for example, by a cotter pin 97, and can be easily removed by a user. This pinned connection allows the rail 65 to be easily opened, and the looped lower ends 29 threaded onto the rail during assembly of the bucket or off of the rail for removal of one or more of the vertical load straps.

The vertical load straps 24 can be easily removed and replaced individually simply by detaching their upper ends as described above, and detaching their lower ends by removing the clevis pin 96 and opening the rail at junction 70 to unthread their looped lower ends 29. Because the load straps are outside of the band clamp 53 it is not necessary to remove the band clamp to replace a strap, and the vertical load straps can be easily slipped out of the sleeves 26 on the skin. These features make maintenance of the vertical load strap system quick and easy. The ability to remove and replace vertical load straps individually can also result in significant cost savings over the life of the bucket.

The spaced bearing pads 67 hold the rail in place while still allowing the rail to flex slightly in response to loading. The bearing pads are generally formed of a hard, durable material, for example a rigid polymeric material such as ultra-high molecular weight polyethylene (UHMW-PE) and have an inward facing groove that receives the rail. The looped lower ends 29 also have some freedom to flex and rotate about the rail 65. The ability of these components to flex and move minimizes stress concentrations that would result from fixed connections. Once installed on the rail 65 the load straps 24 bear the weight of the lower structure 16 plus a portion of the liquid load weight.

Through the transfer of load (water weight and weight of the lower structure) to the vertical load straps 24 and skin support loops 34 (with the skin reinforced in the areas where the loops attach), it is easily replaced parts (the vertical load straps and knuckle joints) that are subjected to the majority of wear and tear rather than the expensive skin. The reduction in stress concentrations on the skin also allows a relatively light weight skin material to be used, which increases available payload and contributes to ease of carrying the bucket system to and from the helicopter.

System Platform

Figure 2C:
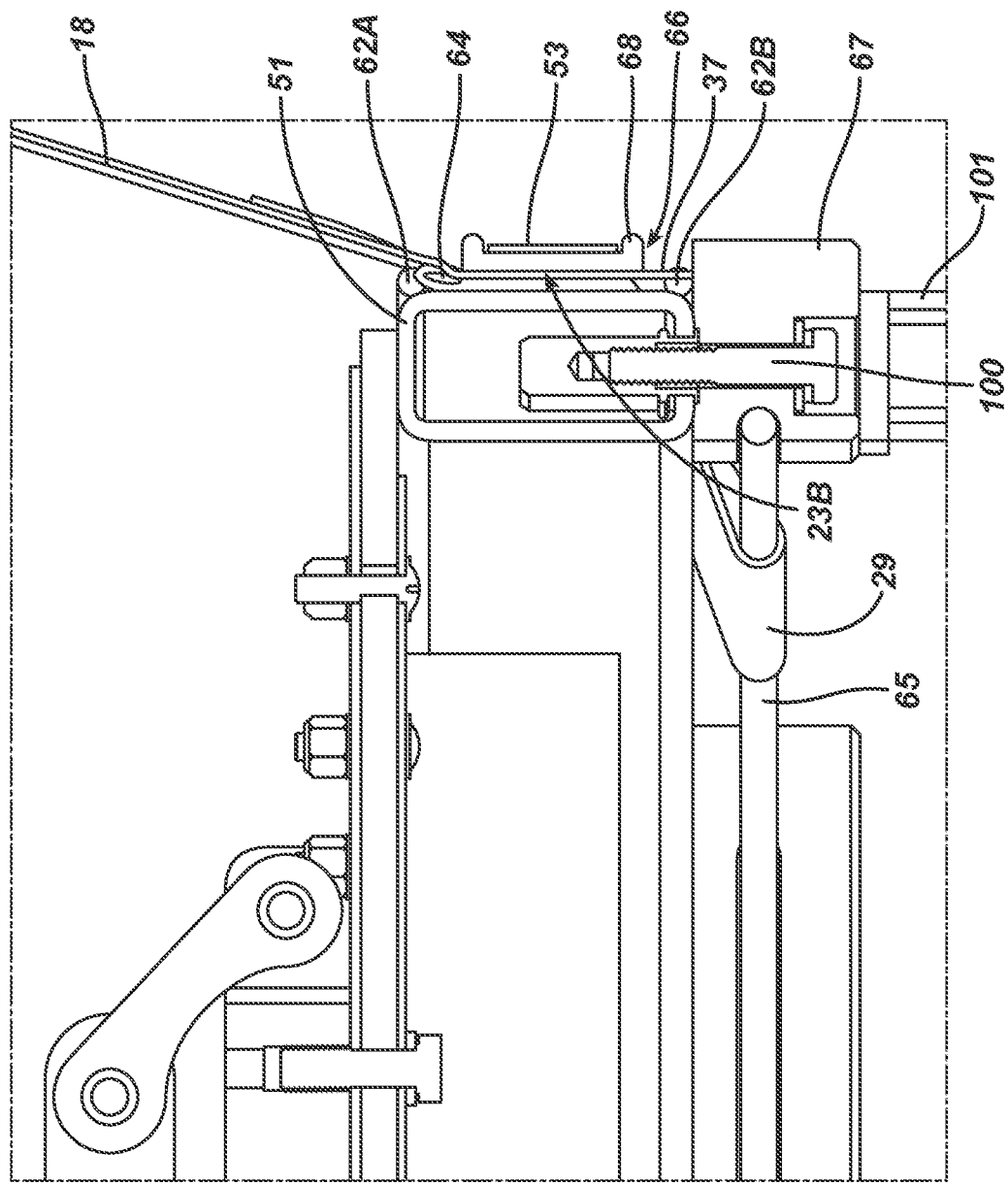
FIG. 2C is an enlarged cross-sectional detail view of the upper portion of the lower structure, showing the area of the upper base ring, to which the band clamp is attached.
Figure 4:
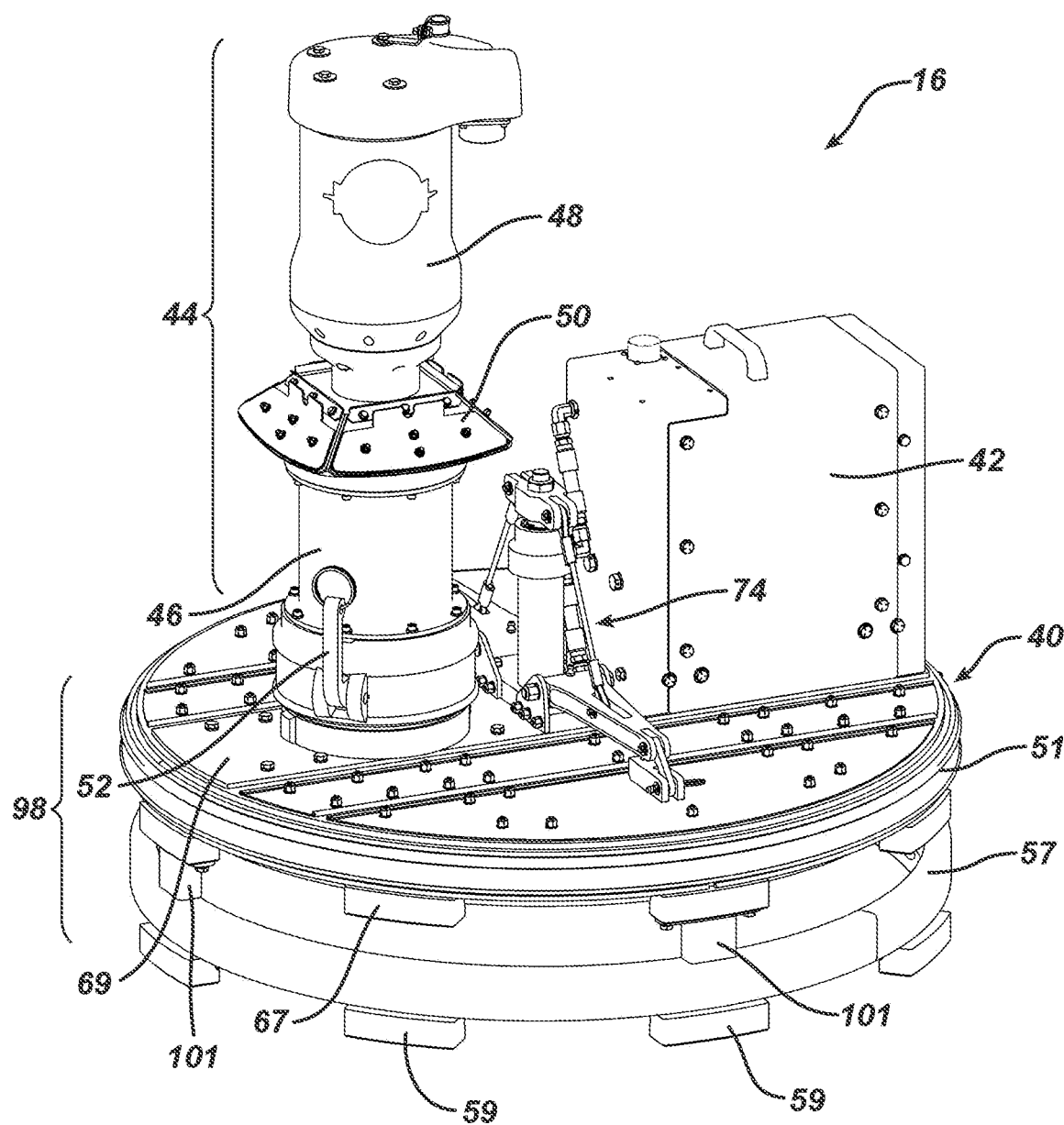
FIG. 4 is a perspective view of the lower structure of the bucket shown in FIG. 1.
Figure 6:
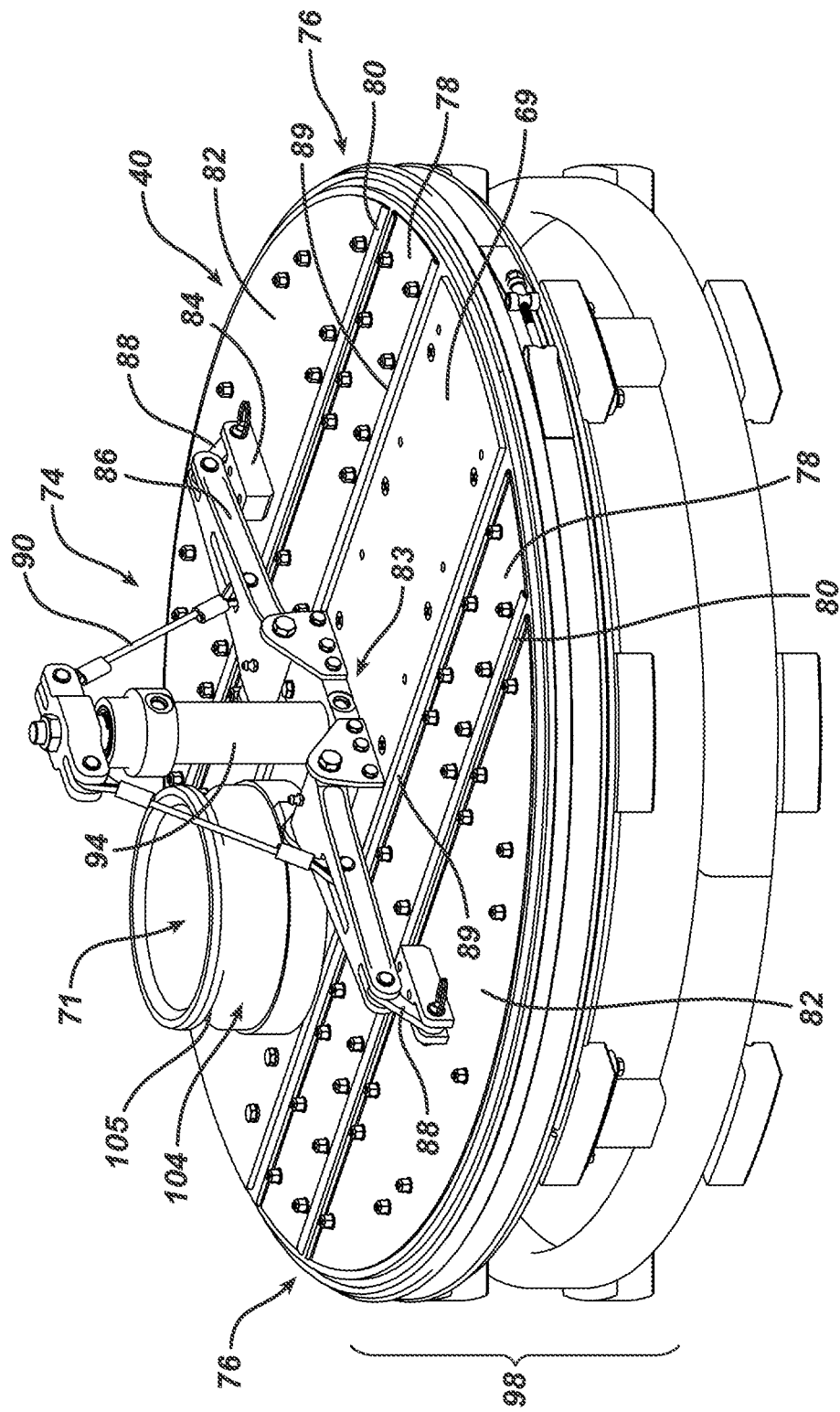
FIG. 6 is a perspective view of the lower structure shown in FIG. 4 with the valve flaps in a closed position and the mounted equipment (pump assembly and power cube) removed.
Figure 6A:
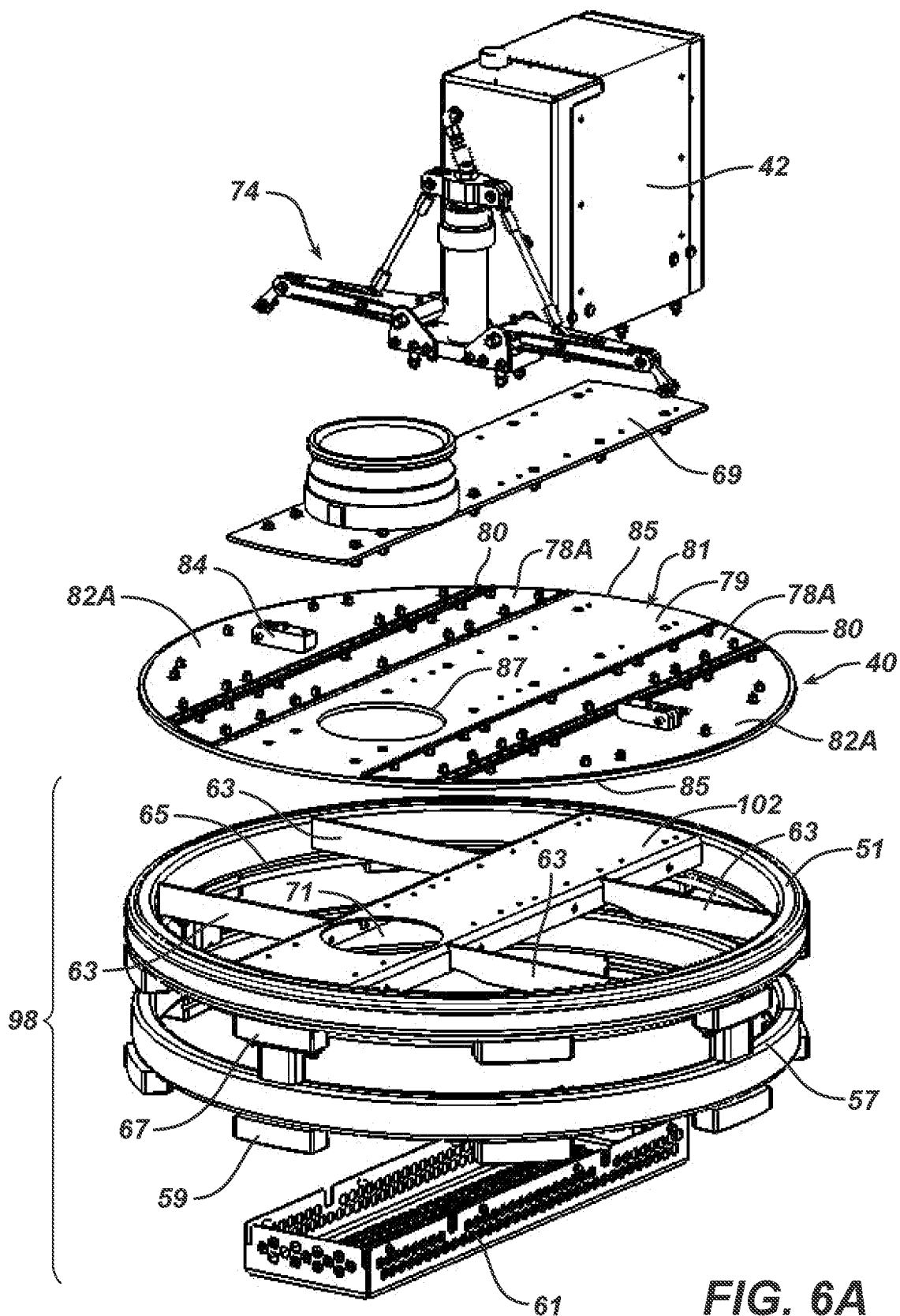
FIG. 6A is an exploded view of the lower structure with the pump assembly omitted.

Referring now to FIGS. 2A, 4 and 6A, the lower structure 16 includes a system platform 98 and a valve plate 40 mounted on the system platform. System platform 98 includes the upper base ring 51, load strap rail 65 and bearing pads 67 discussed above, and, mounted on the upper base ring 51, a lower base ring 57 that is constructed to protect and space the rest of the lower structure 16 from contact surfaces, e.g., a stream bed or the ground. Lower base ring 57 includes a plurality of pad elements 59 to provide further spacing and abrasion protection. Like upper base ring 51, lower base ring 57 may be formed of tubular steel. As can be seen in FIG. 2C, the upper base ring 51 and lower base ring 57 are bolted together (see bolt 100, FIG. 2C) through some of the bearing pads 67 and spacer members 101 with sufficient openings to allow water flow to the pump assembly 44 when power filling.

The system platform also includes two pairs of cross-members 63 (FIG. 6A) that enhance the strength of the platform and support a central member 102, and a perforated screen 61 in the form of a shallow, open-topped rectangular box that is bolted to the central member 102. The central member includes an opening 71 for intake of water into the bucket when power filling. The perforated screen 61 prevents intake of undesirable objects (e.g., objects having a diameter greater than 0.5 inch, which could foul the pump) through the opening 71. This perforated screen 61 and opening 71 may be omitted if the bucket will not include a power fill capability, as may be the case in some small volume buckets.

Figure 6B:
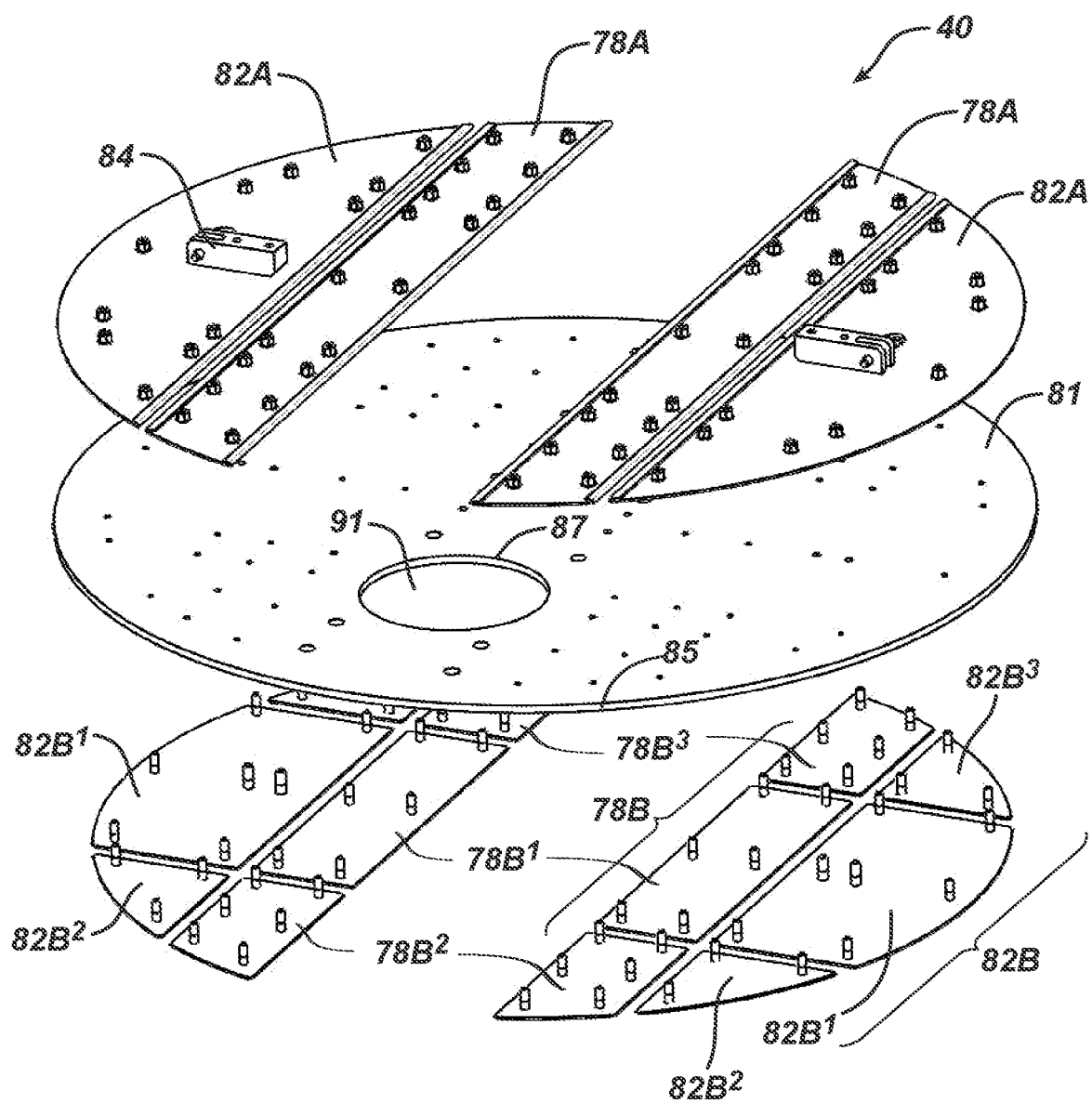
FIG. 6B is an exploded view of the valve plate of the lower structure.

Referring to FIGS. 2A, 6A and 6B, the valve plate 40 includes a circular elastomeric gasket layer 81. This gasket layer 81 is sandwiched between an upper outer valve plate portion 82A (FIGS. 6A-6B) and a lower outer valve plate portion 82B (FIGS. 2A and 6B) made up of three segments $82B^1$, $82B^2$ and $82B^3$, and between an upper inner valve plate portion 78A (FIGS. 6A-6B) and a lower outer valve plate portion 78B (FIGS. 2A and 6B) also made up of three segments $78B^1$, $78B^2$ and $78B^3$. The three segments of the lower plates are provided so that the gasket material of gasket layer 81 is exposed for direct contact with cross members 63 on the downward facing surface of the valve plate 40. The opposed upper and lower valve plate portions are aligned and bolted together through the gasket material, together defining the inner valve plates 78 and outer valve plates 82 (FIG. 6) of valve plate 40. Referring to FIG. 6, the continuous nature of the elastomeric gasket layer provides hinges 80 and 89 between the valve plates. The outer circular edge 85 of gasket layer 81 seals against the upper surface of upper base ring 51, and the inner edge 87 of opening 91 seals around opening 71 in the central member 102, minimizing water loss in these areas.

Above the central portion 79 of the gasket layer 81 of valve plate 40, and aligned with the underlying central member 102, is a support plate 69 which is configured to support a number of elements that allow water to be dropped from the bucket 14, and in some cases filled into the bucket (i.e., if filling is to be performed from the bottom of the bucket rather than the top). The support plate 69 is bolted to the central member 102 through the gasket layer 81. The support plate 69 includes a pump mount 104 in fluid communication with opening 71. Pump mount 104 is configured for secure mounting of pump assembly 44.

Power Fill System

Figure 8:
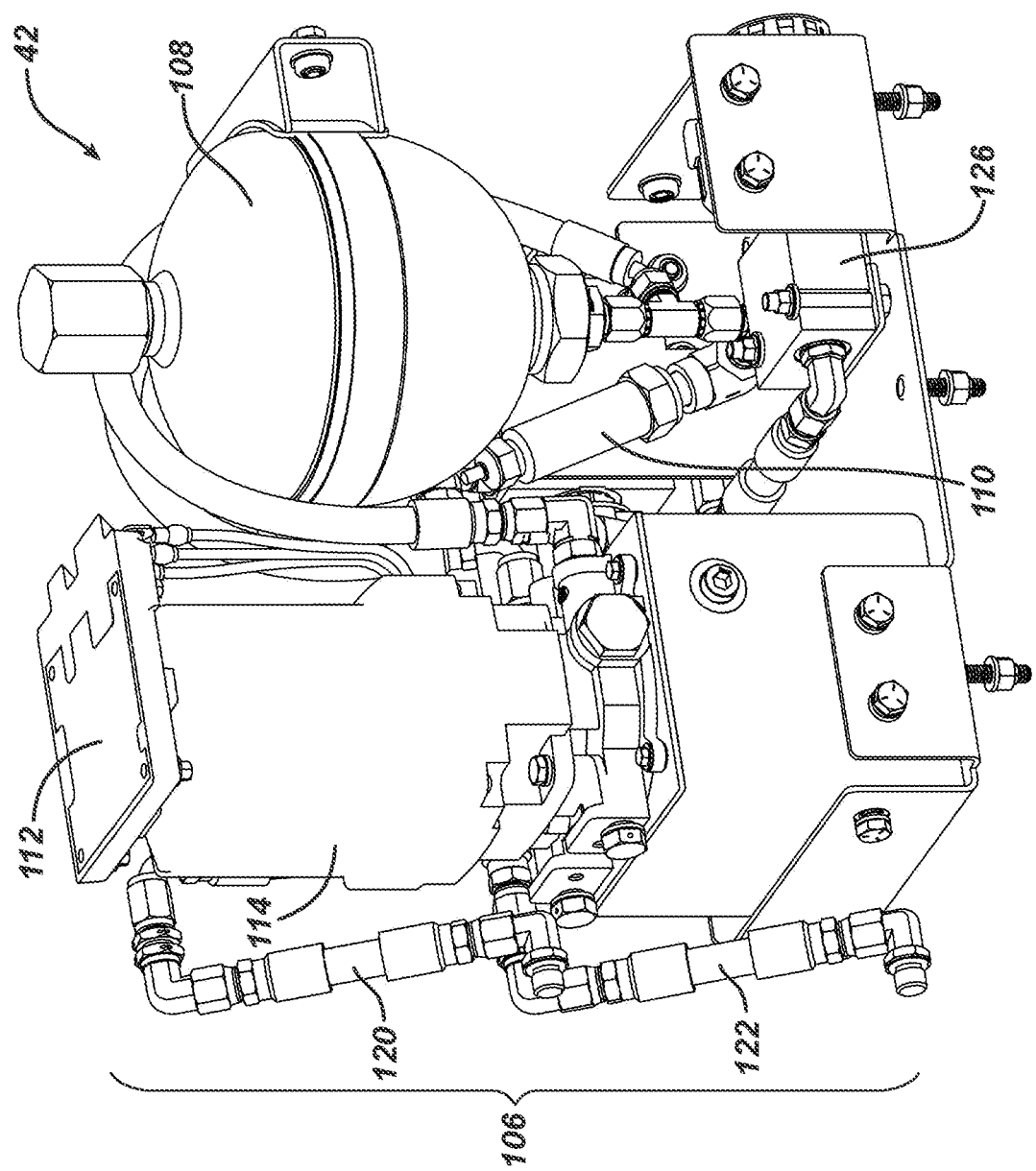
FIG. 8 is a perspective view of the inner components of the power cube.

Removably mounted on the upper surface of the support plate 69 are a power cube 42, components of which are shown in FIG. 8 and will be discussed later, the hydraulic actuator assembly 74, which is in fluid communication with the power cube 42, and a pump assembly 44 that includes a pump 46, motor 48, and power-fill check valve 50. Pump assembly 44 provides power filling functionality and the power cube 42 includes a hydraulic pump and power supply for the valve system, as will be discussed further below. In the pump assembly 44 the motor 48 is positioned directly above the pump 46, allowing the motor shaft to be coaxially aligned with the impeller shaft of the pump (not shown).

Figure 4A:
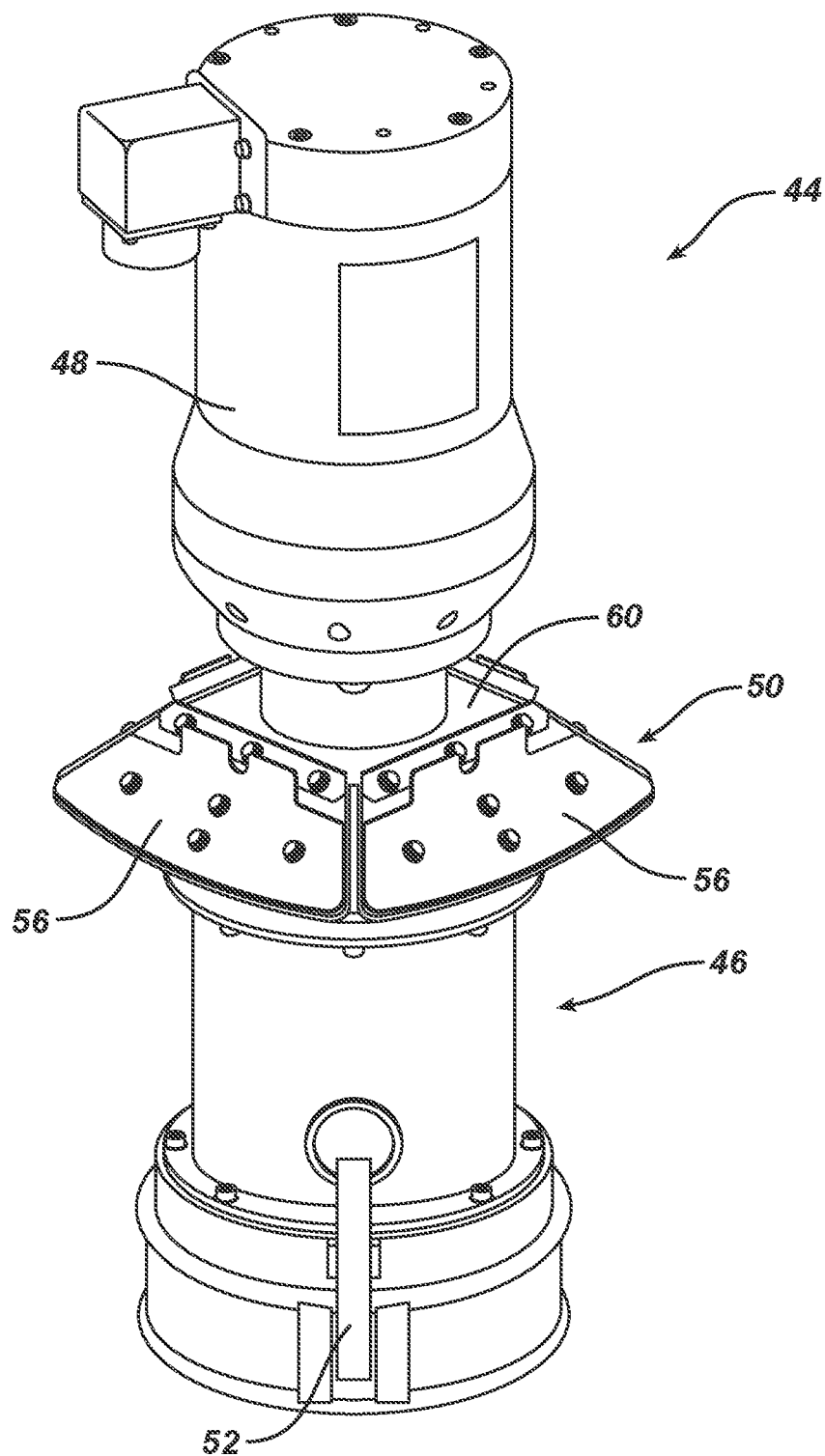
FIG. 4A is a perspective view of the pump assembly shown in FIG. 4, with the fill valve of the pump in a closed position.
Figure 4B:
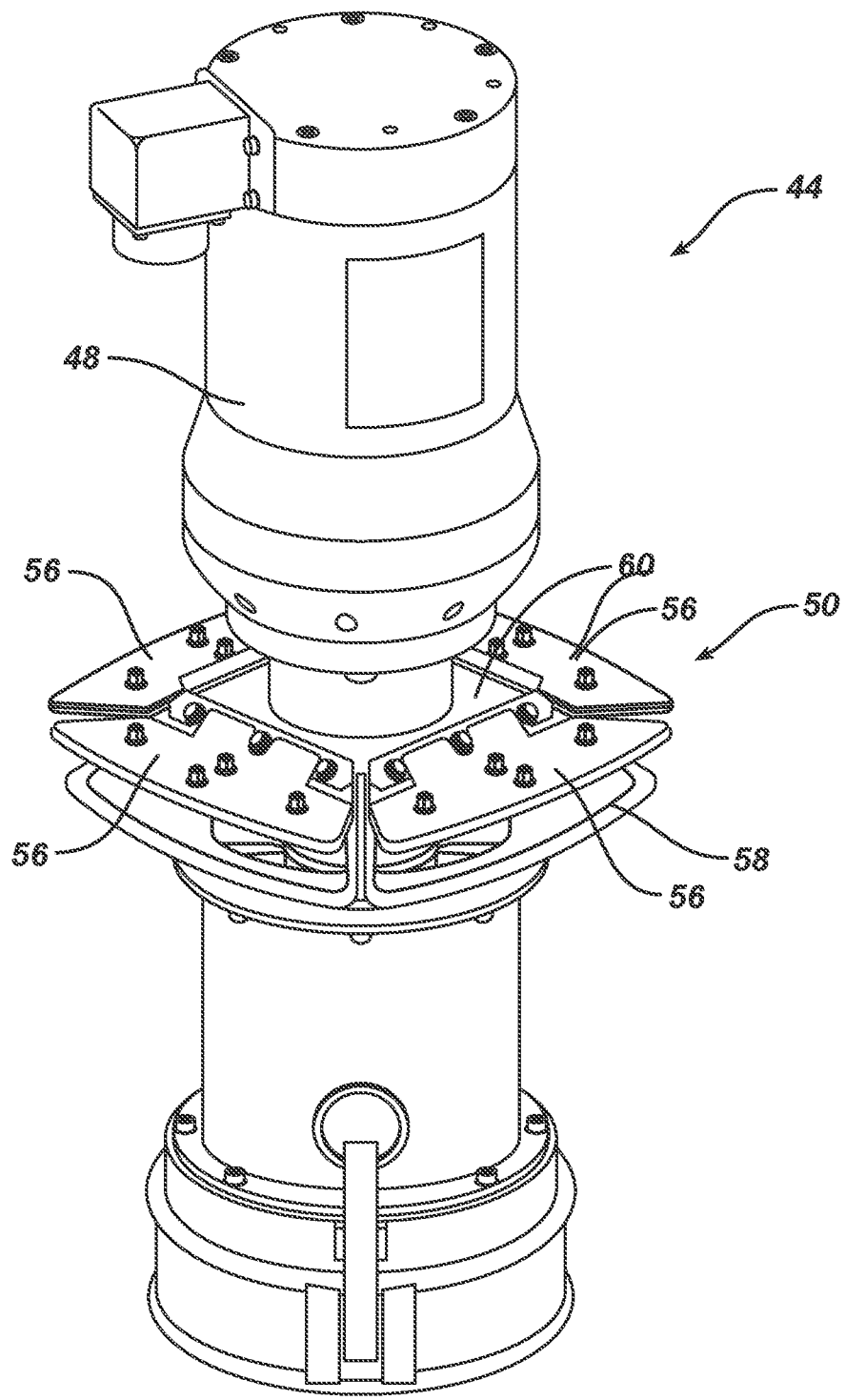
FIG. 4B is similar to FIG. 4A but shows the fill valve in an open position.
Figure 4C:
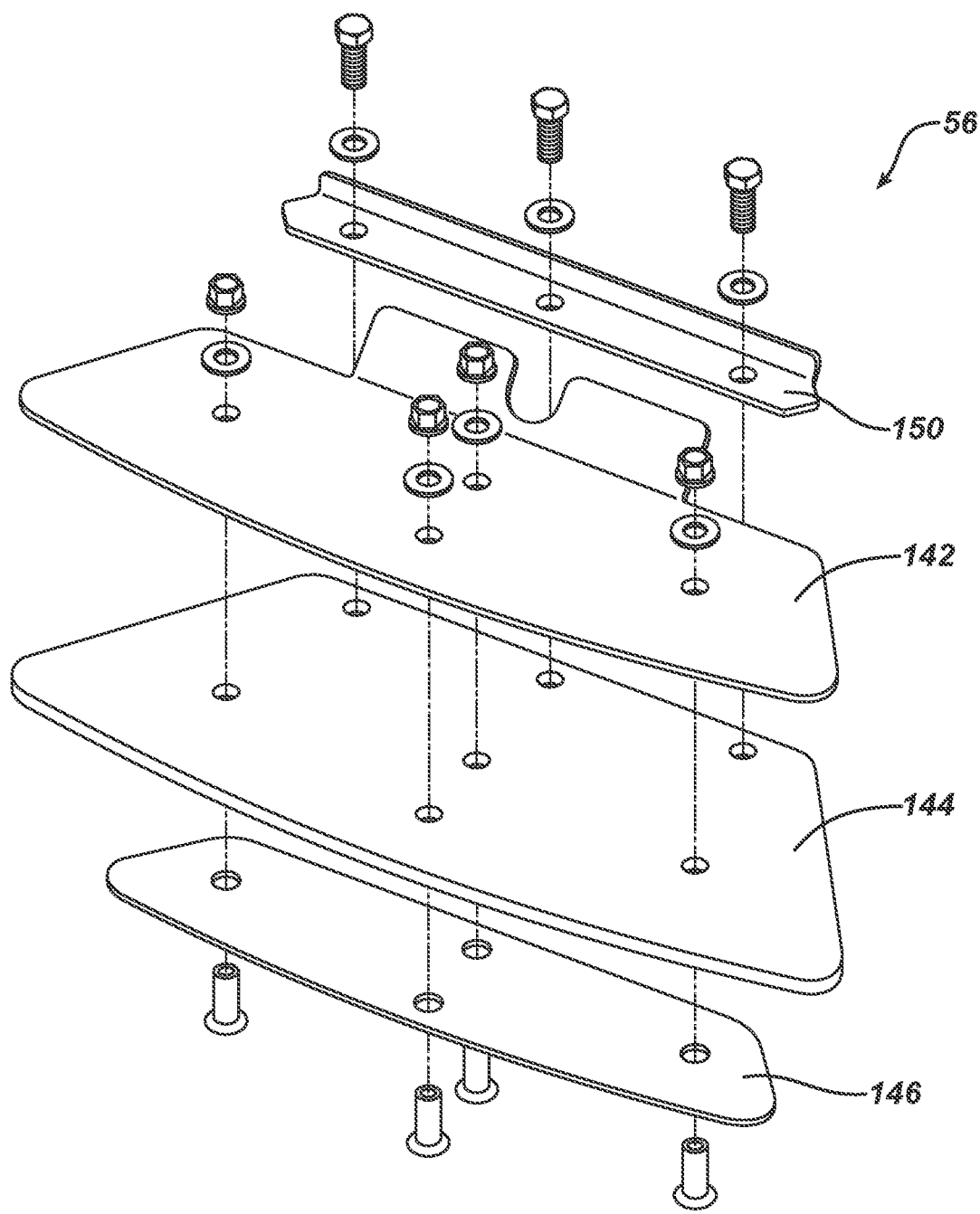
FIG. 4C is an exploded detail view of a check valve of the pump.

Referring to FIGS. 4A and 4B, the power-fill check valve 50 of pump 46 includes four power-fill check valves 56 that are mounted on a central power-fill water outlet 60 with a gasket layer 144 (FIG. 4C) of each check valve acting as a hinge to allow the check valve to move between a closed position (FIG. 4A) and an open position (FIG. 4B). Referring to FIG. 4C, each of the power-fill check valves 56 is formed by sandwiching the gasket layer 144 of elastomeric gasket material between opposed layers of sheet metal (upper plate 142 and lower plate 146) and bolting the layers together, with the lower plate 146 being slightly smaller than the gasket layer 144 to allow the gasket material to form a water-tight seal with the power-fill water outlet 60. Lower plate 146 provides weight for improved sealing. Clamp plate 150 provides a means to both clamp to central power-fill water outlet 60 and limit the hinging action of the gasket material 144. As the check valve rotates open, the bent flanges of the upper plate 142 come into contact with the clamp plate 150 and are restricted from translating upward by the upper flange on the clamp plate.

Figure 4D:
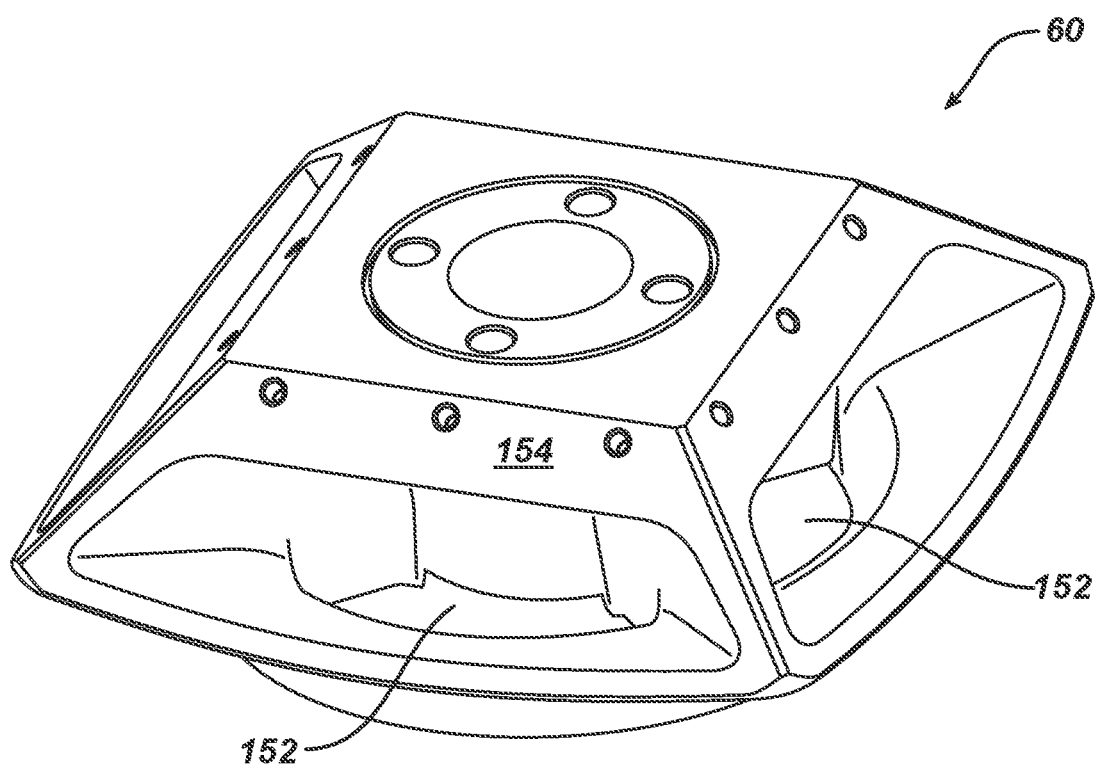
FIG. 4D is a perspective view of the power-fill water outlet of the pump assembly.

The power-fill water outlet 60 is shown in FIG. 4D. This component includes four angled discharge openings 152. An outer surface 154 of the power-fill water outlet 60 provides a frame about each opening against which the check valves 56 can seat. The power-fill water outlet may be formed, for example, from cast aluminum, and redirects water entering it at the bottom through curved ducts to provide an annular discharge of water through the angled discharge openings 152.

The power-fill check valves 56 are arranged and dimensioned such that, with the power-fill water outlet 60, they form a square, centered about the axis of the pump, when in the open position (FIG. 4B). The evenly spread water discharge pattern eliminates the large water jet discharge reaction force that is present with single-outlet designs like those using a single large elbow. The number of flaps may be more or less so long as they are centered about the axis of the pump and provide for channeling the water from the pump into the bucket interior volume. When the valve is open, water flows out of the pump in a continuous 360-degree pattern, equalizing forces on the pump assembly (rather than having forceful fluid flow out of only one side of the pump, as is conventional when an elbow outlet pipe is used). In the closed position (when the pump is inactive), the flaps are seated on a flange 58 (shown in FIG. 4B) with the weight of the flaps holding them in place. Each of the power-fill check valves 56 can be serviced independent from the others by easily accessible stand hex head bolts.

This valve configuration is advantageous because it is space efficient, due to the tower arrangement of the pump and motor, and due to the 360-degree flow pattern and lack of a heavy pipe on one side eliminating the need for bracing, which is generally required for an elbow outlet pipe configuration. The simple design of the hinged power-fill check valves 56 provides a robust valve that is easily maintained.

Figure 5:
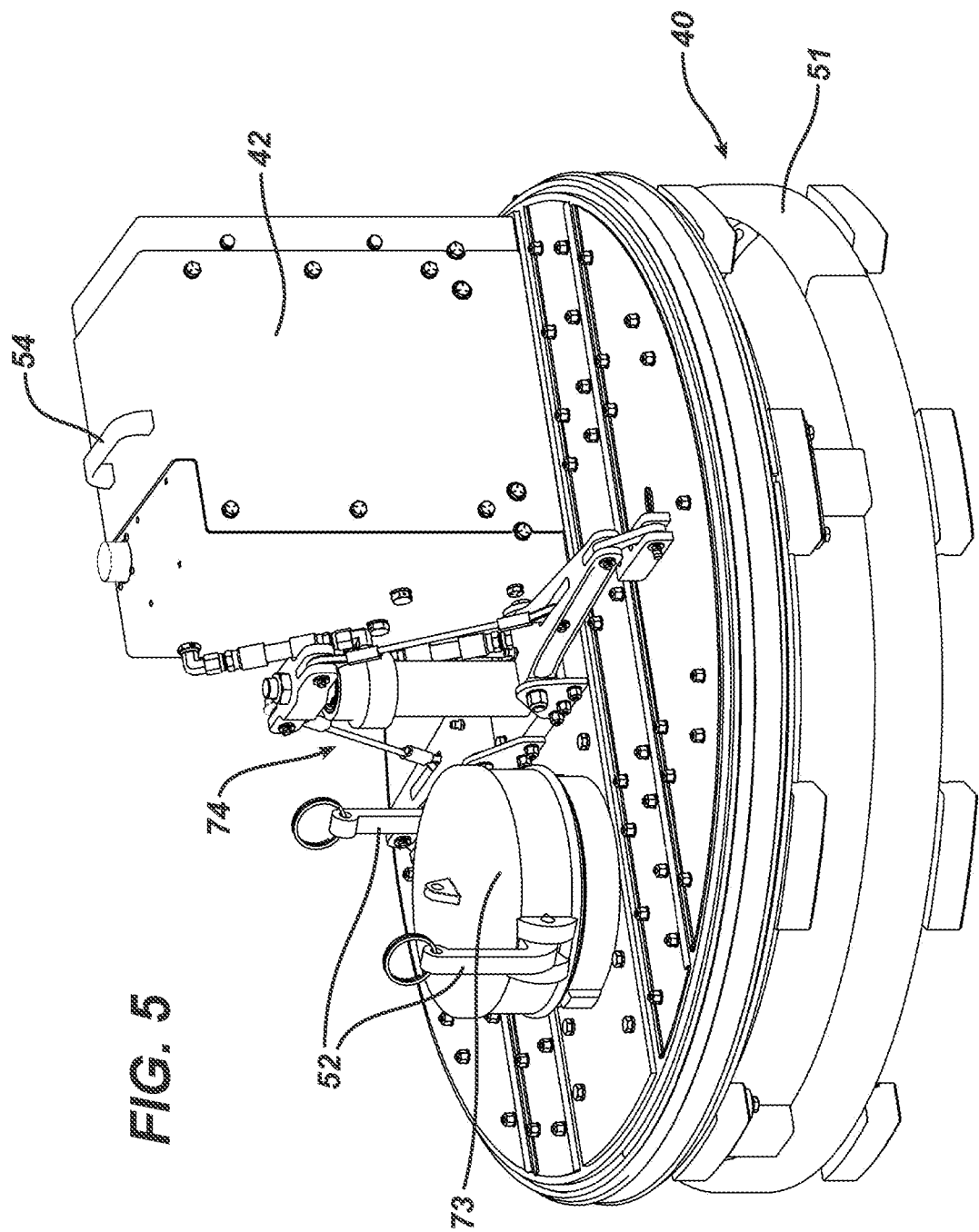
FIG. 5 is a perspective view of the lower structure shown in FIG. 4 with a cap in place of the pump assembly.
Figure 5A:
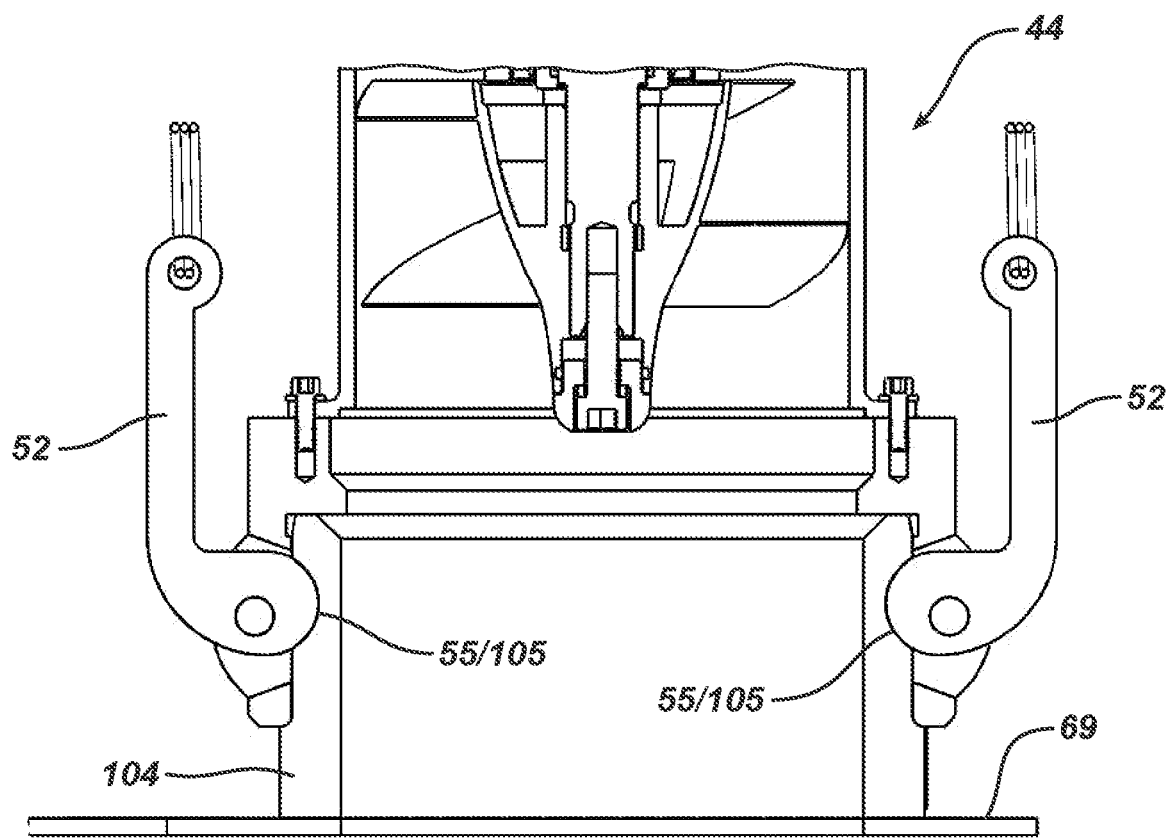
FIG. 5A is a side cross-sectional view of a portion of the lower structure, showing the camming attachment of the pump assembly.

Referring to FIG. 5, the pump assembly 44 shown in FIG. 4 can be easily removed by a user utilizing quick release cam handles 52, with a cap 73 being attached to cover the opening 71 (FIG. 6) when the pump assembly is not in place. Preferably, the pump assembly and cap are mounted with a camming attachment, which provides a strong and secure mounting of the pump assembly to the valve base. Referring to FIG. 5A, cam handles 52 include camming surfaces 55 that engage a circumferential groove 105 on the outer surface of pump mount 104 (best seen in FIG. 6) when pulled upward by a user and disengage from the groove when pushed downward to release the pump assembly from the pump mount.

The power cube 42 is also removably attached to the support plate 69. Removal can be facilitated by a quick release (not shown) or performed using hand tools. The power cube can then be easily carried using handle 54 after disconnecting electrical connections and disconnecting the tubing in fluid communication with the hydraulic actuator assembly 74. Electrical power and control signals, to be further described below, are provided from the helicopter to the power cube via electrical harness connector 47.

The pump assembly can be removed by the user if the bucket system is to be used on a contract that does not require power fill capability, thereby saving weight in the bucket system.

Figure 7:
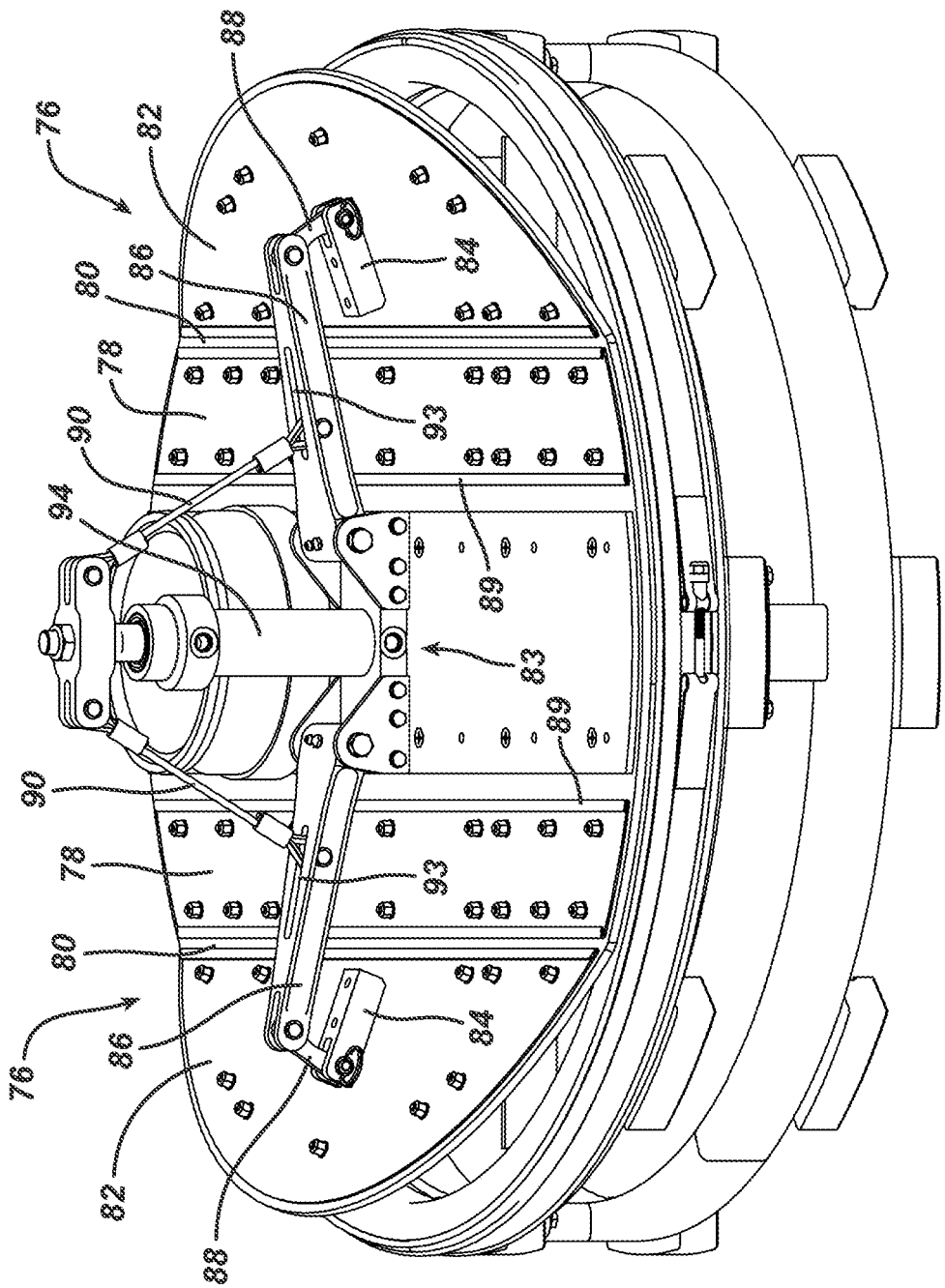
FIG. 7 is a perspective view similar to FIG. 6 but with the valve flaps in a partially open position.
Figure 7A:
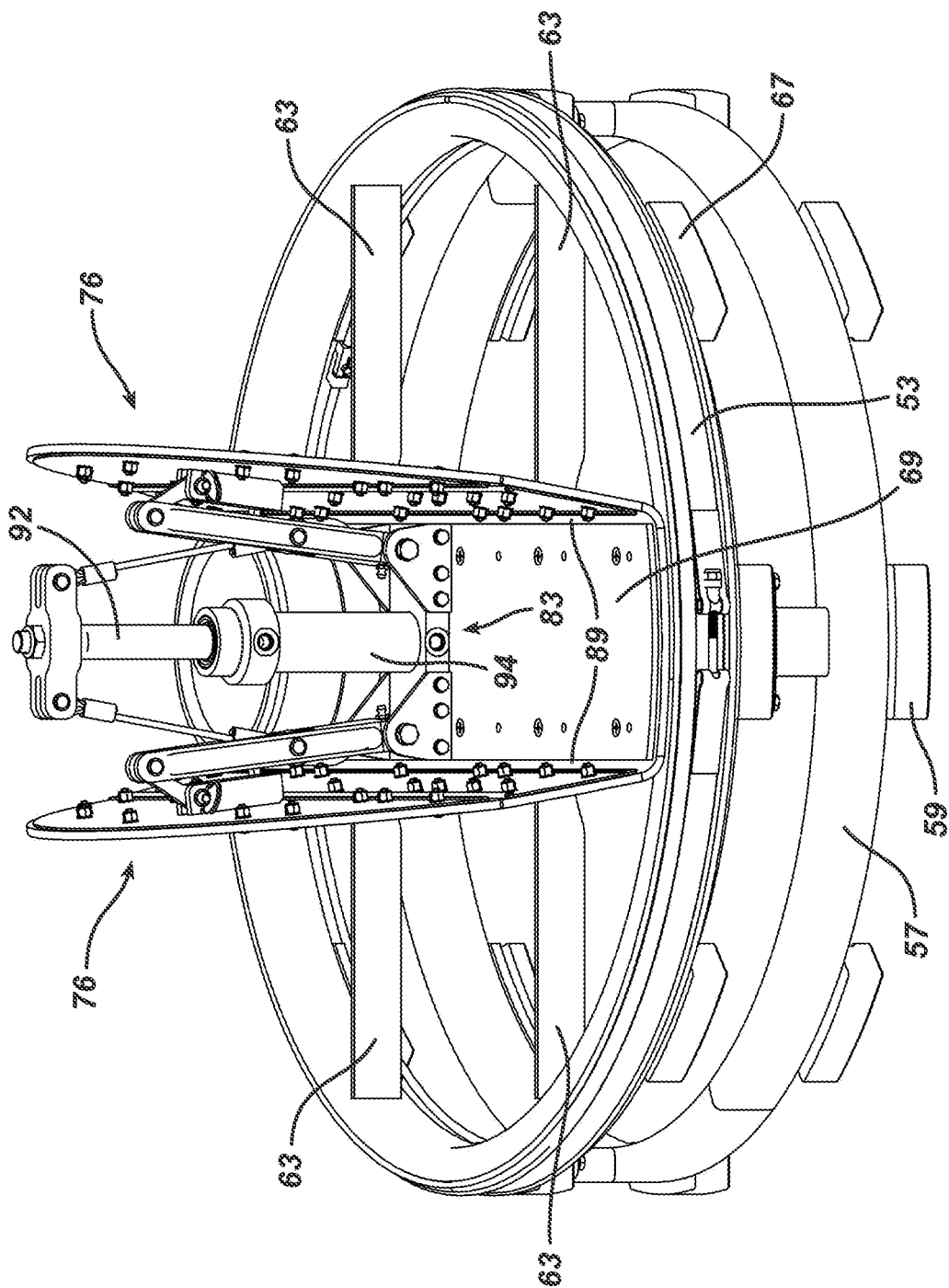
FIG. 7A is a perspective view similar to FIGS. 6 and 7 but with the valve flaps in a fully open position.

The lower structure 16 also provides valving for delivering water from the bucket onto or near a fire. Referring to FIGS. 6-7A, the valve system includes a hydraulic actuator assembly 74 and, operably joined to the actuator assembly, a pair of flapper valves 76 (part of valve plate 40) that are configured to be moved between closed (FIG. 6), partially open (FIG. 7), and fully open (FIG. 7A) positions.

As discussed above, the valve plate 40 has a multi-layer structure, including upper and lower plates and an elastomeric gasket material sandwiched between the plates. Each flapper valve 76 of the valve plate 40 includes (a) an inner valve plate 78 that hinges about an inner hinge 89 (formed by the elastomeric gasket layer) and (b) an outer valve plate 82 that is joined to the inner valve plate 78 by a flexible elastomeric outer hinge 80 (also formed by the elastomeric gasket layer). The inner hinge 89 is defined on one side by the inner valve plate (which includes upper and lower portions as previously discussed) and on the other by the opposition of the central member 102 and support plate 69.

Actuator assembly 74 is coupled to each flapper valve 76 by an attachment block 84 mounted on the flapper valve. Blocks 84 are bolted on so that they are replaceable. The actuator assembly 74 includes a central actuator base 83, fixedly mounted on support plate 69, a pair of long arms 86, a pair of dog links 88, a pair of cables 90, and a hydraulic actuator piston 92 (FIG. 7A). The actuator piston 92 is mounted within an actuator housing 94 that extends through the actuator base 83.

Each dog link 88 is pivotably attached to the attachment block 84 at one end and to the long arm 86 at the other end. The dog links are secured with removeable pins at each end to make it quicker and easier to disconnect, e.g., for maintenance of the actuator, than a bolted joint. A bolt & nut are not required since no clamping force is needed at this joint that is only subjected to a shear load. Each long arm 86 is pivotably attached to the dog link at one end and the actuator base 83 at the other end. Each of the cables 90 is attached to one of the long arms 86 along the length of the long arm between the dog link and the actuator base. A groove 93 (FIG. 7) is provided in a top surface of each arm 86 to allow a clearance for the cable when the valve is fully open (FIG. 7A).

Hydraulic extension of the actuator piston 92 out of actuator housing 94, as shown in FIGS. 7 and 7A, pulls up on cables 90, which initially causes the outer valve plate 82 to pivot upward about the outer elastomeric hinge 80, moving the valve to its partially open position (FIG. 7). Continued upward movement of the actuator piston and thus the long arms raises the inner valve plate 78, pivoting the plate 78 about inner elastomeric hinge 89 and moving the valve to its fully open position (FIG. 7A). The dog links 88 allow free movement without binding as the valve moves through opening and closing and the hinging action at the flapper transitions between rotation about hinges 80 and 89. The dog link 88 enables the flapper to rotate about hinge 80 as the long arm 86 rotates about its pivotable attachment at the actuator base 83 to reach the partially open position shown in FIG. 7. Further extension of the actuator piston 92 (FIG. 7A) continues to rotate the long arm 86 about the actuator base 83 as the dog links 88 allow the flapper rotation to transition from the outer hinge 80 to the inner hinge 89 adjacent to the support plate 69.

The actuator piston can be stopped and held at any point during extension or retraction to control the outflow of water. Additionally, the open and close cycle can be repeated multiple times. This gives the operator the ability to make multiple water drops with a single bucket load of water.

It should be noted that the valve is not fixed in its closed position (FIG. 6). Instead, it is merely the weight of the water that holds the valve closed when the bucket is filled. In this state, the flapper valves are supported by crossmembers 63. If the bucket is empty and is forcibly submersed in water the pressure of the water will open or partially open the flapper valves. The ability of the valve to open automatically in response to pressure from below prevents the valve from being subjected to undesirable stresses from below when the empty bucket is submersed.

Power Cube Hydraulics

Referring now to FIG. 8, power cube 42 includes a hydraulic system 106 that is operably connected by fluid communication (via hoses, not shown) to actuator piston 92 (FIG. 7A) and thus controls the operation of the actuator assembly 74 discussed above, and an onboard power source that powers the hydraulic system. The onboard power source includes a hydraulic accumulator 108, a pressure transducer 110, and a printed circuit board 112 housed within an enclosure. The printed circuit board may be encased either in a smaller water-tight enclosure or coated in a water-proof coating/potting. It is noted that the position of the power cube and the relative positions of the components of the power cube herein described may vary without departing from the scope of the invention.

Figure 9:
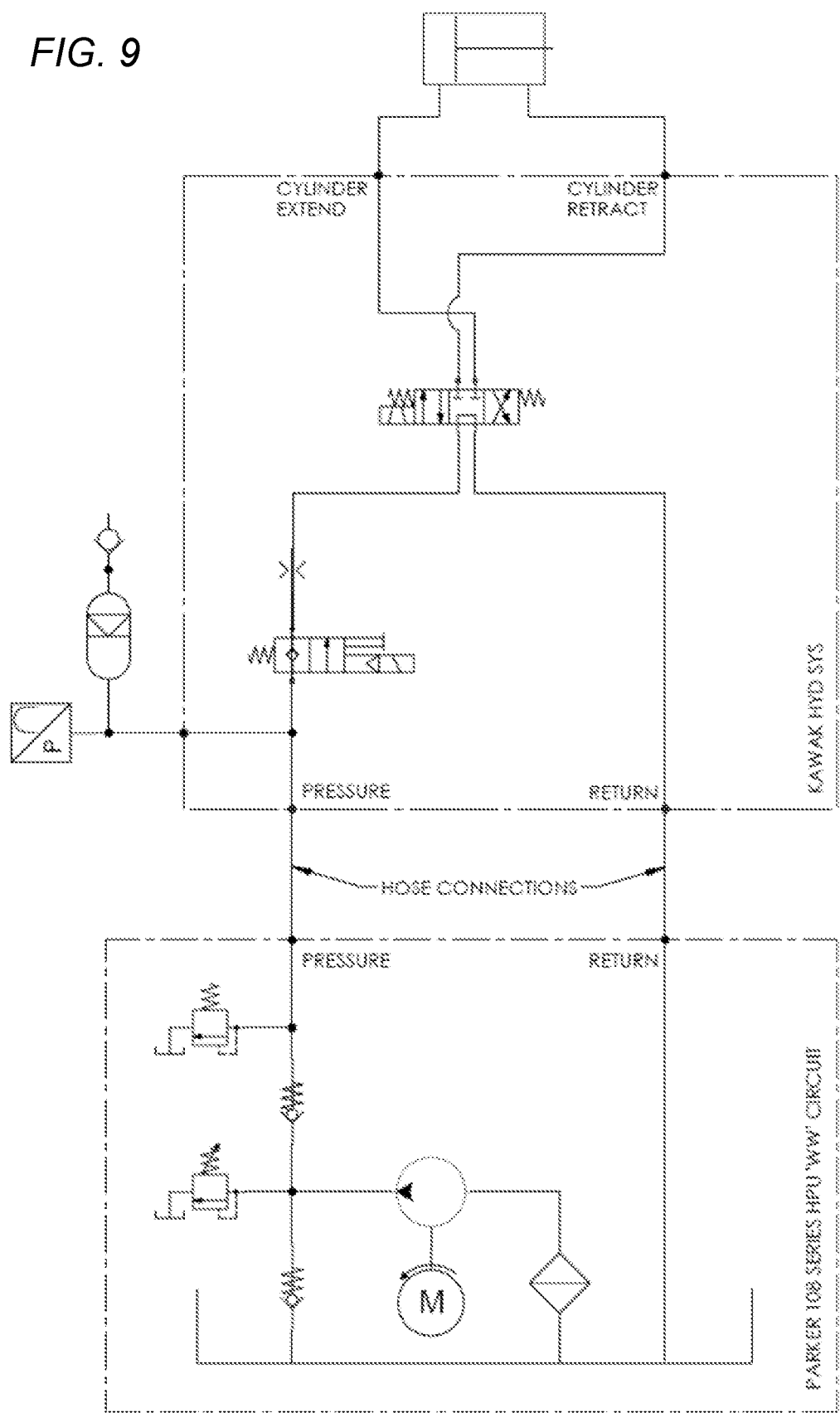
FIG. 9 is a schematic of the power cube pressure control system in communication with the actuator piston.

With reference to FIGS. 8 and 9, turning first to the hydraulic system 106, system 106 includes a DC motor 114 operatively connected to a hydraulic manifold and a hydraulic pump 116 that is in fluid communication with a hydraulic fluid reservoir 118. In response to signals from the printed circuit board 112, the pump 116 pumps hydraulic fluid into the accumulator 108 to store pressurized fluid. The printed circuit board 112 also responds to inputs from the operator to extend and retract the actuator piston 92, with the pressurized fluid being supplied from the accumulator. In response to inputs from the operator received by the printed circuit board, hydraulic system 106 extends the actuator piston by hydraulic pressure applied to the actuator piston via cylinder extend hose 122, thus opening flapper valves 76. In response to inputs from the operator received by the printed circuit board, hydraulic system 106 retracts the actuator piston by hydraulic pressure applied to the actuator piston via cylinder extend hose 120, thus closing flapper valves 76.

The accumulator 108 stores energy, and releases energy as needed. Energy is supplied to the accumulator 108 at a low rate (low power) over a long time interval, e.g., using a power cable from the helicopter. The accumulator 108 delivers the energy at a high rate (high power) over a short time interval to the hydraulic cylinder of actuator piston 92 when it is necessary to open the flapper valve. As is well known in the field of hydraulic accumulators, the accumulator stores fluid under pressure and pushes the fluid into the hydraulic system (hydraulic circuit), which is controlled by the hydraulic valves, when it is needed to open the flapper valve. Advantageously, the use of the hydraulic accumulator 108 eliminates the need to run a heavy power cable from the helicopter to the bucket typical of electrical actuator designs.

Figure 10:
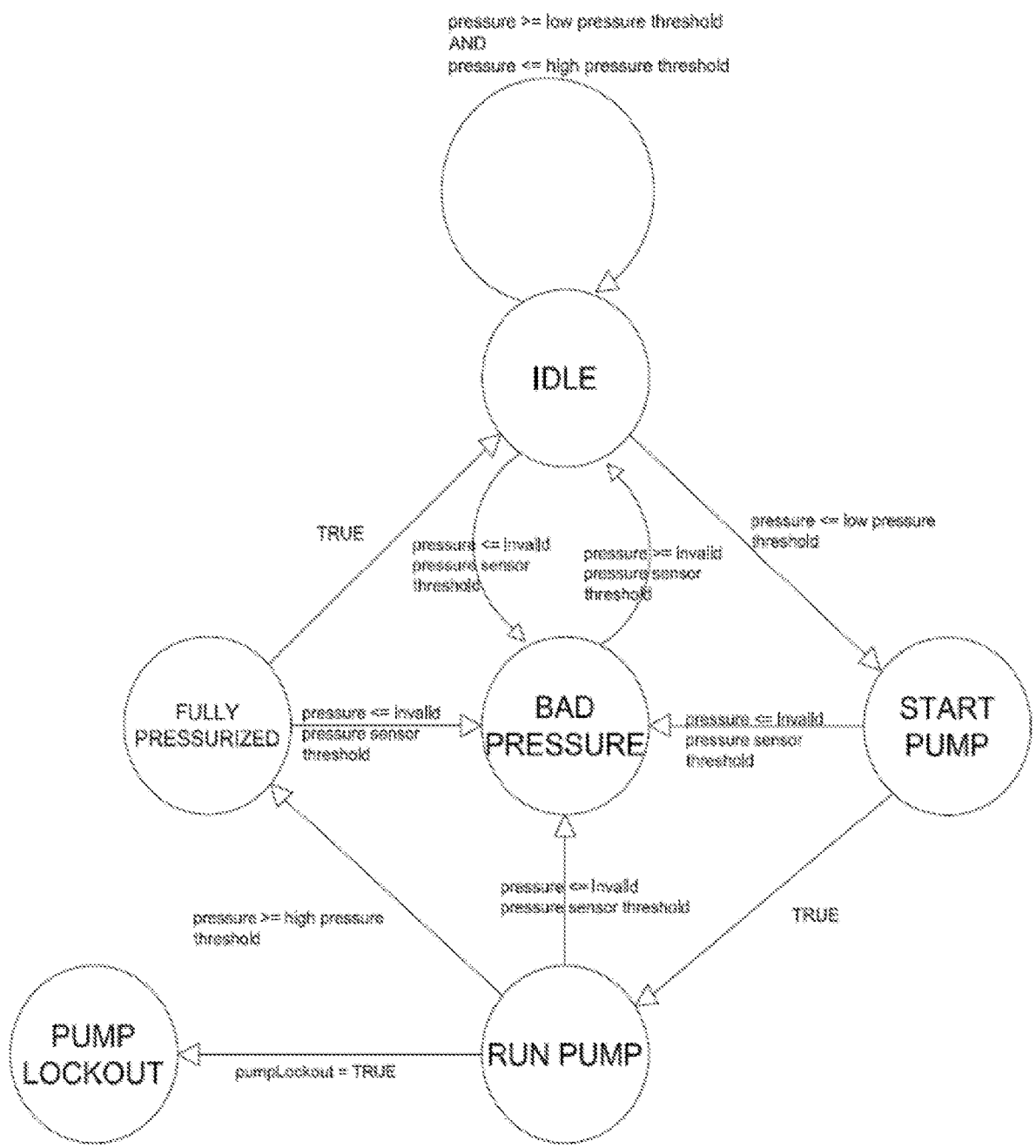
FIG. 10 is a state diagram depicting an accumulator pressure control state machine implemented by the printed circuit board in communication with the pressure transducer and pump motor control.

A signal from the pressure transducer 110 is continually monitored by the printed circuit board 112, the printed circuit board implementing a state machine as depicted in FIG. 10. The state machine operating on the printed circuit board evaluates whether the system hydraulic pressure is within a predetermined operating range or not (upper and lower pressure threshold values). If system pressure is between the upper and lower threshold values, nothing is done. If system pressure is at or below the lower pressure threshold, the printed circuit board 112 turns on the DC motor 114 to drive the hydraulic pump 116 and increase pressure in the accumulator 108 until it is at the upper threshold value, at which point the DC motor 114 is stopped. Monitoring of the hydraulic system pressure transducer includes monitoring for upper and lower invalid pressure sensor thresholds to ensure safe operation in case of failure of either the pressure sensor or hydraulic pump system.

Figure 8A:
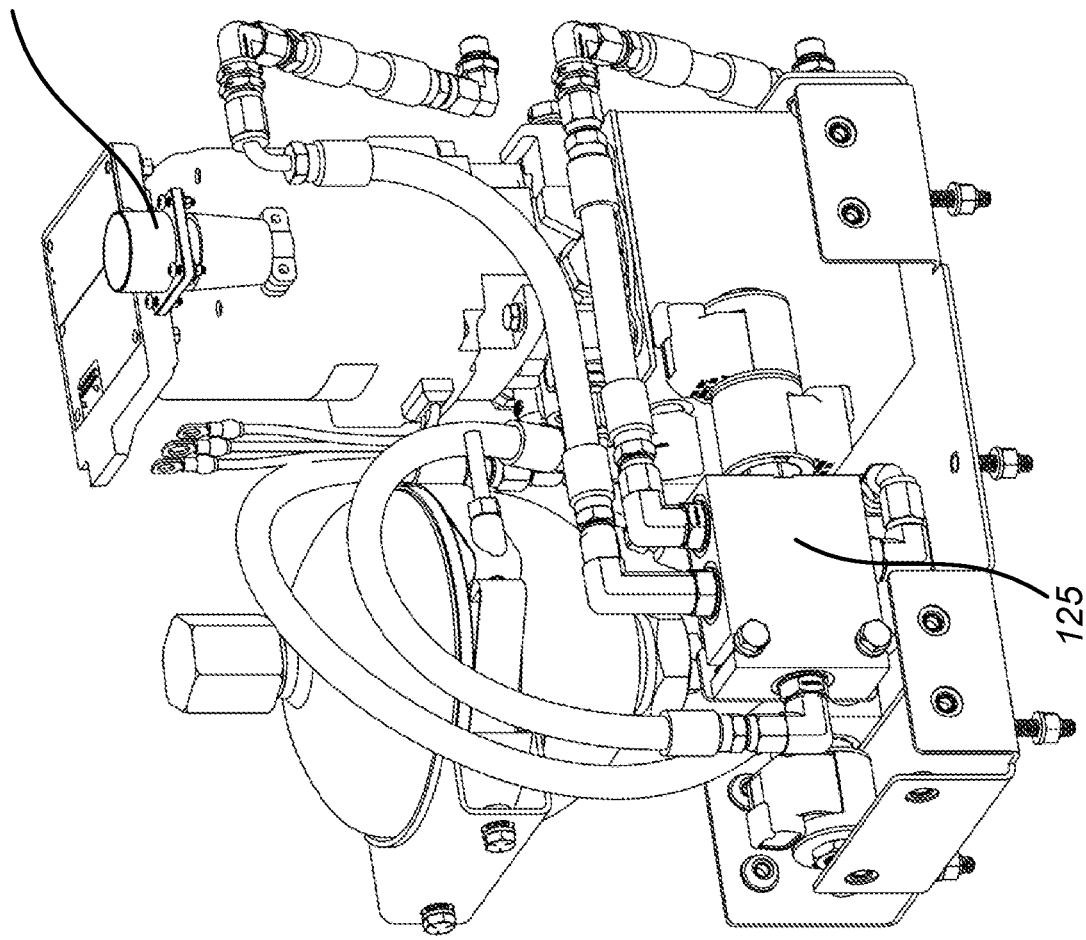
FIG. 8A is a perspective view of the inner components of the power cube, as observed from the rear side of FIG. 8.

Control of the hydraulic cylinder of the piston 92 is accomplished by opening and closing a directional control valve 125 (FIG. 8A) and an isolation valve 126 (FIG. 8) that is in-line with the directional control valve. The directional control valve controls the direction of flow of fluid to and from the hydraulic cylinder of piston 92, while isolation valve 126 is provided to prevent leakage of pressurized fluid to the hydraulic cylinder of piston 92.

Actuating the piston 92 in either direction consumes pressurized fluid from the accumulator. As described above, a reduction in the system hydraulic pressure below the predetermined lower pressure threshold causes the printed circuit board to operate the DC motor to drive the hydraulic pump, thus recharging the pressure in the accumulator to the predetermined upper pressure threshold. When the volume of fluid expelled from the accumulator results in the pressure again dropping below the low-pressure threshold, the printed circuit board turns on the motor again to re-pressurize the accumulator up to the high-pressure threshold. The function of the motor and pump is only to supply pressurized fluid to the accumulator, not to directly drive the piston 92.

The accumulator is sized to allow multiple actuations of the hydraulic actuator piston. Accordingly, for most conditions, the motor and pump are not running while the valve system is being actuated. Preferably, the accumulator is sized to allow 1-2 actuations of extension and retraction of the piston, or 3-4 such actuations within a short-time sequence, for example, within a 15-20 second interval. More rapid cycling by an operator between actuations may cause accumulator pressure depletion sufficient to operate the hydraulic pump during value system actuation. The hydraulic pump running during value system actuation may supply fluid movement sufficient to complete the cycling during an extension or retraction, however, at a slower rate. Hydraulic pump with a displacement of 0.010 in$^3$/rev at a maximum pressure of 3000 psi and accumulator rated capacity of 1.0 liter (60 in$^3$), fluid capacity 0.5 liter (30 in$^3$), maximum pressure of 3000 psi, may, in some embodiments, provide sufficient sizing for the above-described actuations.

Directional control valve 125 may, in a preferred embodiment, be a three-way spool valve having "open" and "close" flapper valve (76) positions. The directional control valve may be a traditional spool-type hydraulic valve which has a fairly high leakage rate. If too much hydraulic fluid leaks past the directional control valve and into the cylinder, actuation of the flapper valve cannot be well controlled. Thus, the isolation valve 126, a low-leakage poppet-type valve, is situated just upstream of the directional control valve. Isolation valve 126 may be under control of the printed circuit board, and may be actuated to block flow until the printed circuit board receives a signal to open or close the flapper valve. Isolation valve 126 may have two ports, functioning to either allow flow in one direction or block flow in the one direction. Thereby, isolation valve 126 may be used to prevent leakage past the directional control valve by blocking the pressurized fluid before it reaches the inlet port of the directional control valve.

Operation of the Bucket

Setting up the bucket for use is accomplished by the following steps:
- Set the rolled-up bucket on its base
- Take the lifting plate and rigging cables and straighten them out
- Unroll the skin and prepare the inlet frame
- Expand the inlet frame and install arm pins to lock it open
- Shift the inlet frame so that it is positioned over the valve base
- Clear the area around the refill pump inlet and install the refill pump (if equipped)
- Attach the lifting plate to the cargo hook on the belly of the helicopter
- Make the electrical connections to helicopter power
- Power up the system and test functionality of the refill pump and the hydraulic system Firefighting water buckets are typically operated in remote areas. When in use, the bucket is filled at the water source by either dip-filling or power-filling if a refill pump is fitted to the bucket. After filling, the pilot ferries the full bucket to the fire site. Upon reaching the fire, the operator can decide how to dump the water. The water valve can be controlled manually to open partially or fully, depending on what is needed at the time. This manual control can be leveraged into performing multiple partial-drops if the situation calls for it. Control of the water valve is accomplished by a three-position switch located in the cockpit, and it is frequently added to the cyclic for convenience. The switch is pressed one direction to open the valve, and the other direction to close it. The center position holds the valve where it is. When the bucket has been emptied, the pilot returns to the water source for another load and the process is repeated.

Figure 11:
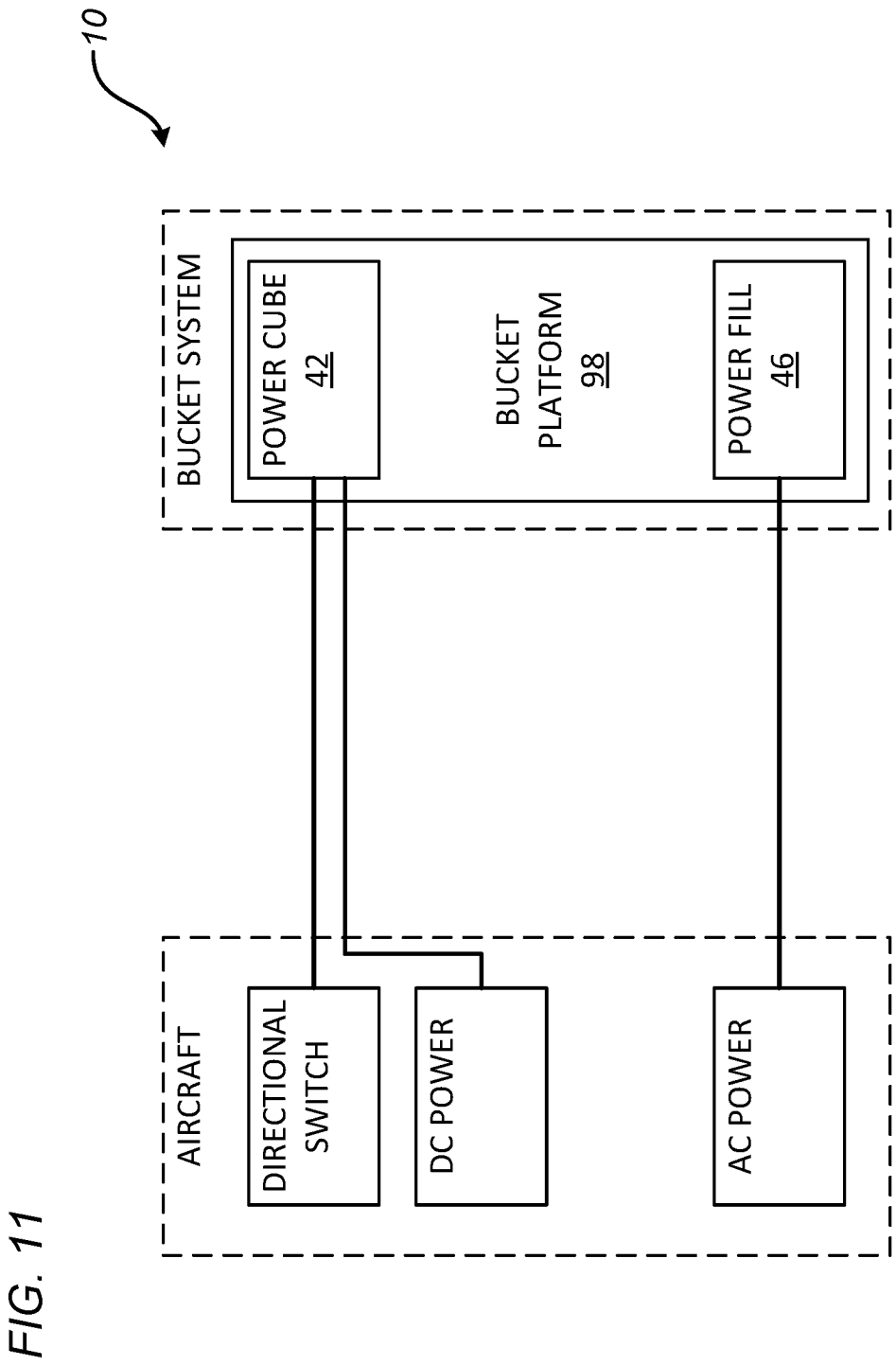
FIG. 11 is a depiction of the electrical connections from an aircraft to the bucket system power cube and optional power fill system.

Disassembly of the entire bucket system can be accomplished with common hand tools. The design has several features that take ease of maintenance into consideration, including:
- The refill pump assembly contains only one motor, greatly simplifying the maintenance of this subsystem compared to competitors' designs
- Cam & groove connection for the refill pump makes it tool-less, which streamlines the setup and teardown procedures
- Lift straps are separate from the skin rather than being integral so that they can be replaced individually in the event of damage, rather than needing to repair the skin itself, which is a much larger task
- Detent pins for the inlet frame arms and flapper clevis blocks instead of bolts and nuts makes these joints tool-less
- All of the water valve actuation system is located inside the bucket, so there isn't a separate 'control-head' suspended above, with cables extending down to the water valve, as is common in other existing systems. This makes for a cleaner installation and less to deal with during setup/teardown
- The hydraulics system can be removed as a single unit for servicing Electrical Power and Control Signaling As previously described, control of bucket operations via electrical connections to the power fill system and power cube system may be provided by electrical cables connecting power and control signaling from a helicopter to the bucket platform. FIG. 11, for example, depicts aircraft power and control systems providing AC power, DC power, and a directional valve control switch to the bucket platform. AC power, DC power, and directional control may be provided by existing aircraft electrical facilities under the control of an aircraft operator. AC power may be provided as three-phase, 400 Hz power for the operation of the optional power fill pump. DC power may typically include 24-28 VDC power for the printed circuit board power supply and accumulator pump motor. The hydraulic pump motor may be rated at 425 watts. Directional controls may include analog or digital signaling to the printed circuit board as unipolar digital or differential voltage signaling, such as RS-422 (TIA/EIA-422) as is commonly known in the art. It is noted that the AC and DC power levels, and the signaling voltages may vary without departing from the scope of the invention.

AC power, DC power, and control signal cabling may be provided to the bucket system by one or more single electrical cables, or a bundled electrical cable according to the power and control requirements of the bucket system. As previously noted with respect to the operation of the power cube, DC power may be a low-power cable and thus of a higher gauge electrical cable than may be conventionally required by prior art systems.

Power Cube Control Components

Figure 12:
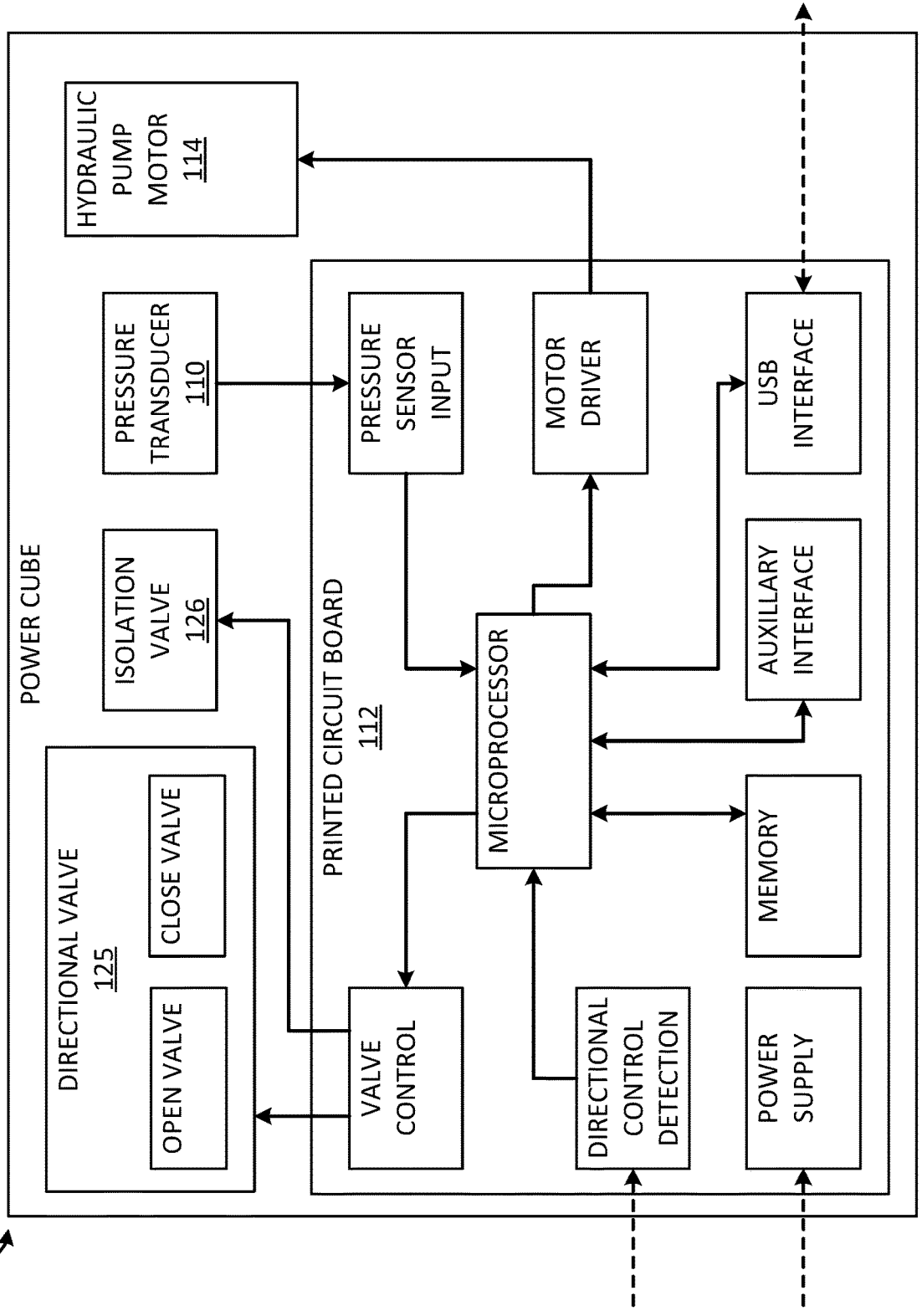
FIG. 12 is a schematic of the power cube showing the printed circuit board in electrical communication with the hydraulic system components of the power cube.

FIG. 12 depicts the hydraulic control components of the power cube 42 in communication with printed circuit board 112. As previously described, directional control valve 125 in communication with actuator piston 92 provides value open (extend piston) and valve close (retract piston) operations to control the filling of the bucket system. Isolation valve 126 provides low-leakage control of hydraulic flow to the directional control valve, thus preventing the actuator piston from prematurely extending and allowing water entry before requested by an operator. Actuation of the valve via the directional control open and close valve may be performed by control of a momentary switch, thus allowing the bucket system to hold the bucket valve partially open when the directional switch is released for a slower water drop (i.e. "load holding").

Monitoring and control of the power cube for the operation of the bucket system is performed by the microprocessor in communication with interface components on printed circuit board 112. Printed circuit board may be a custom printed circuit board or preferably, the printed circuit board may be an ARDUINO™ processor board configured with digital and/or analog inputs and output controls, a power supply, memory, a USB interface for connection to a maintenance computer, a motor controller, and auxiliary interfaces as depicted in FIG. 12. Such processor board may be configured with program instructions stored in the memory for execution by a processor to implement the operations of the power cube herein described. Program instructions may include codes and code libraries programmed in a high-level language such as the "C" or C++ programming language or variant.

Power Cube Operation

Figure 13A:
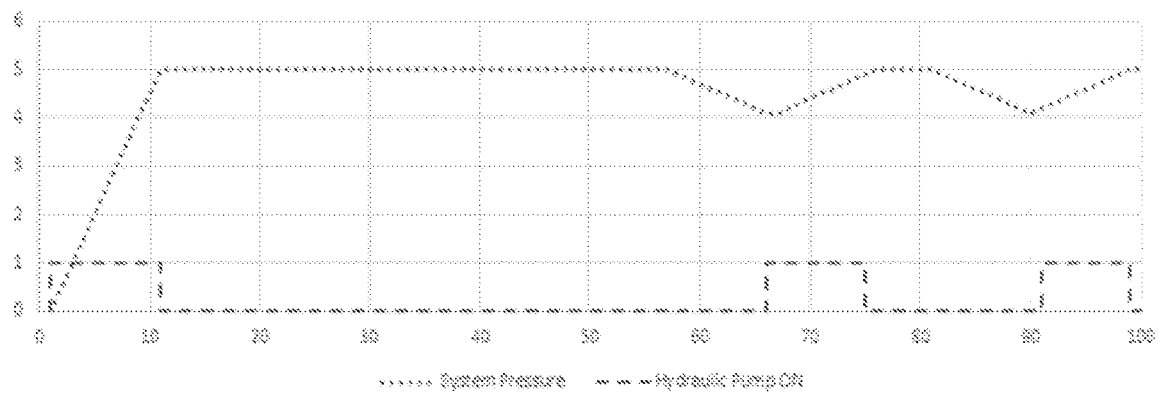
FIGS. 13A, 13B, and 13C depict system pressure and hydraulic pump operation, water pump and water level, and button stimulus and door response according to one example of the operation of the bucket system.
Figure 13B:
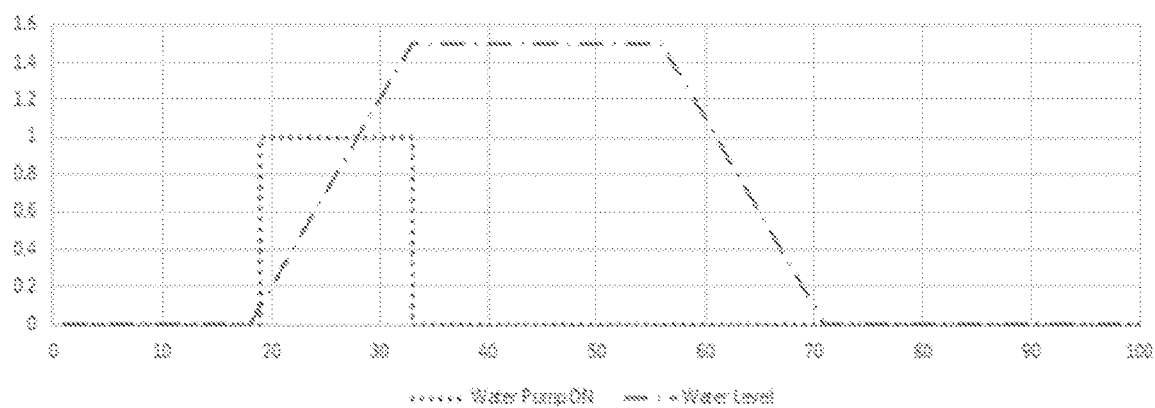
Figure 13C:
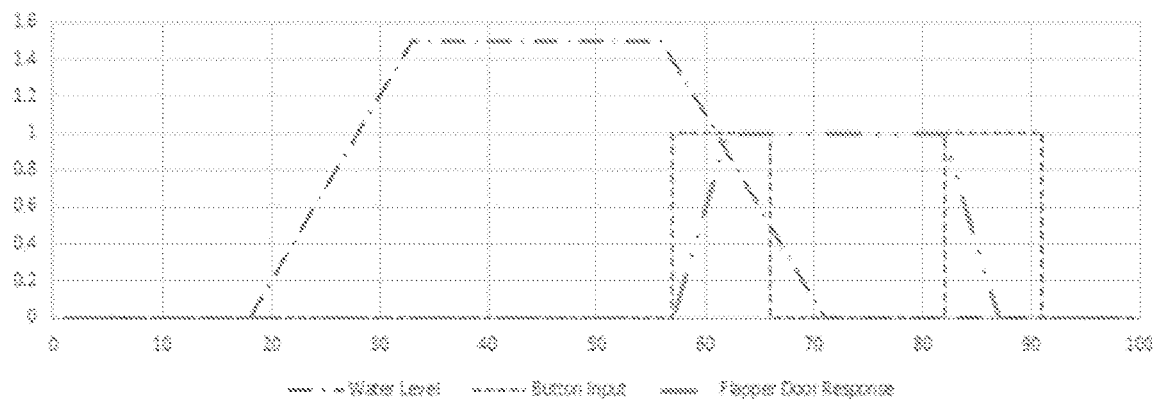

FIGS. 13A, 13B, and 13C depict the timeline of operation of the bucket system for one filling and one discharge cycle using the optional power fill system in combination with the power cube hydraulic valve control system. It is noted that the operation depicted in the figures is by example only, according to one embodiment of the invention. The timeline and numeric levels indicated on the drawings are exemplary only.

FIG. 13A shows the pressurization of the accumulator by operation of the motor driving the hydraulic pump. Upon applying DC power to the bucket system, printed circuit board 112 initiates system hydraulic pressure monitoring and hydraulic pump motor operation according to the state machine of FIG. 10. At time zero of FIG. 13A, the accumulator is discharged at zero pressure, and the motor is off. At a time after time zero, the motor is turned on the hydraulic pump begins charging the accumulator. Pressure increases until an upper threshold is reached, at which time the motor is turned off, and charging ends. As previously described, the operation of the motor to run the pump for charging of the accumulator is performed by the state machine of FIG. 10 implemented and controlled by the microprocessor in communication with the components of the printed circuit board. Accordingly, as previously explained, hydraulic pressure monitoring and charging of the accumulator operates asynchronously and independently of the filling and discharging operations of the bucket power fill system.

FIG. 13B shows the filling of the bucket via the power fill system. At approximately 19 seconds, the power fill pump is turned on by the operator of the aircraft. Filling continues until the water level of the bucket reaches 1.5 units, at which time power to the power fill pump is turned off by the operator.

FIG. 13C shows the operation of discharging the water from the bucket system. At approximately 57 seconds, the operator indicates via the directional switch to open the valve, thus signaling to the power cube to extend the actuator piston via the directional control valve. Extending the actuator piston opens the flapper door valves, thereby discharging the water in the bucket system. Emptying of the bucket continues until approximately time 82 seconds, at which time the directional switch is set by the operator to close the bucket valve, thus signaling the power cube to retract the actuator valve via the directional control valve. Retracting the actuator valve closes the flapper door valve, thereby slowing the flow of water from the bucket system. At approximately 91 seconds, the flapper valve is fully closed and the operator may disengage the directional control switch having discharged the bucket over the intended target.

Returning to FIG. 13A in view of FIGS. 13B and 13C, at times approximately subsequent to each operation of the direction control valves and the corresponding extension or retraction of the actuator piston, the accumulator system pressure is shown decreasing to a lower threshold. Upon detection via the pressure transducer of the decrease in accumulator pressure to the lower threshold, the processor initiates recharging of the accumulator by turning on the accumulator motor pump. For example, at approximately times 66 seconds and 92 seconds, the motor is turned on as the system pressure falls to at or below 4 units. The hydraulic pump motor thus remains on until the accumulator system pressure has returned to the upper threshold of 5 units. In this manner, the power cube maintains sufficient pressure in the accumulator for each subsequent operation independently of the operation of the directional control valve and associated opening or closing of the flapper valves.

Figure 14:
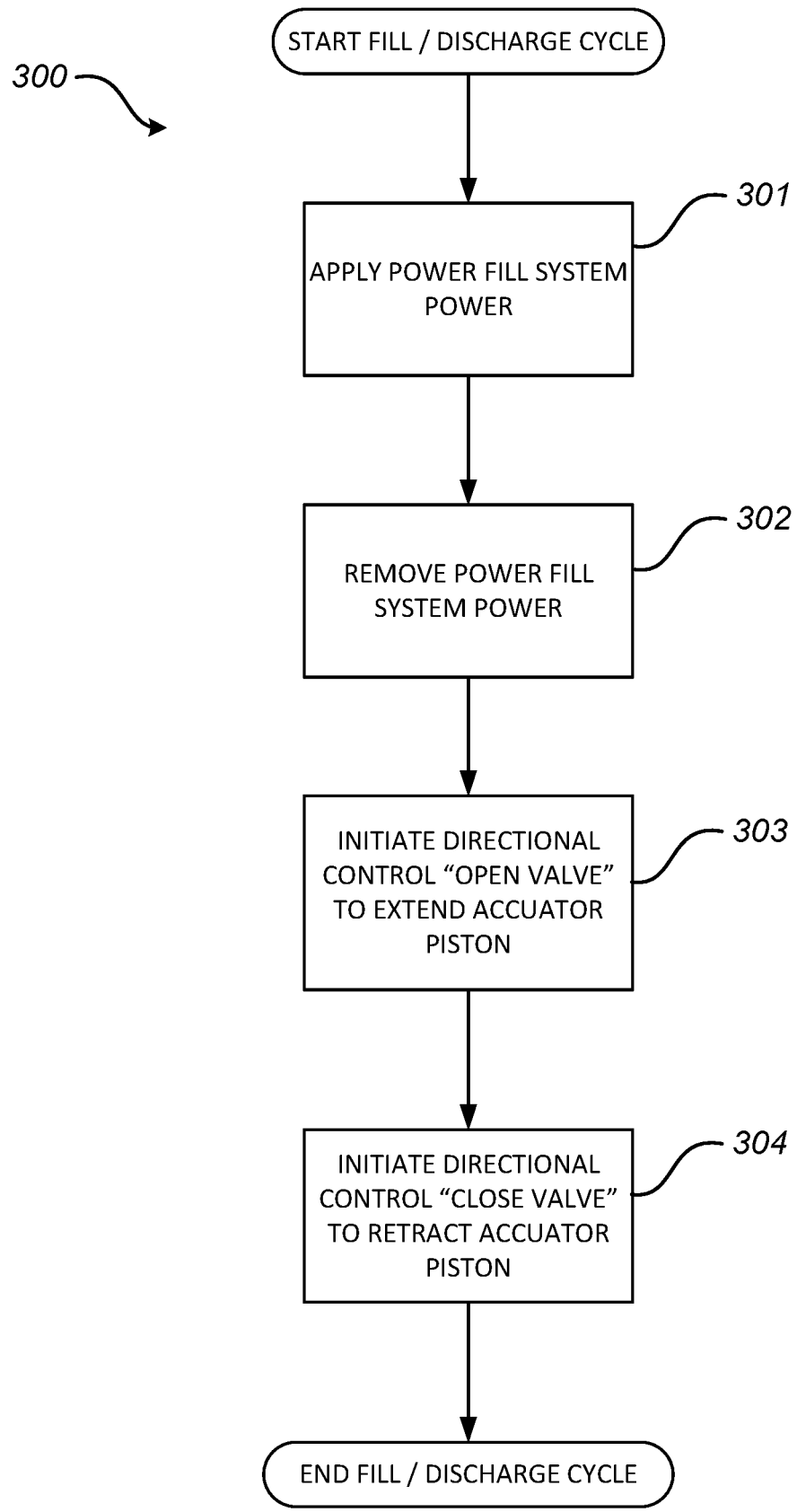
FIG. 14 is a flowchart of steps of the operational example of FIGS. 13A, 13B, and 13C.

FIG. 14 depicts a method of operation 300 for the bucket fill and discharge operation according to the example operation described above. At step 301, with the bucket system positioned over a water source, power is applied to the power fill system to draw water into the bucket system, and power is removed at step 302, when the water fill level is achieved. With the bucket system positioned by the aircraft over the drop site, at step 303 in response to the operator-initiated "open" valve control command, the directional control value is actuated by the printed circuit board to supply accumulator hydraulic fluid to extend the piston, thus opening the valve and discharging water from the bucket system. At step 304 in response to the operator-initiated "close" valve control, valve control circuits actuate the directional value control to the closed position, thereby supplying hydraulic fluid to retract the piston to close the valve. In this example, the bucket system achieves one complete fill/discharge cycle and is ready for subsequent cycles of filling and discharging.

Other Embodiments

A number of embodiments have been described. Nevertheless, it will be understood that various modifications may be made without departing from the spirit and scope of the disclosure.

For example, other types of lower structures, including ones without a power filling option, can be used with the buckets described herein. Conversely, the lower structures described above, and/or the power fill and/or power cube systems, can be used with other types of buckets.

Additionally, while in the embodiment discussed above the power cube is a separate module from the actuator, this configuration requires breaking the hydraulic lines between them which subjects the hydraulic system to contamination due to dirt entering the lines at the open connections. To avoid this issue, in some implementations the actuator is integrated with the power cube so that the integrated actuator/power cube can be removed as a single (though larger) actuator service module. As is the case with the pump assembly, removal of the integrated actuator service module would require disconnection of the electrical wiring and could utilize tool-free attachments (e.g., a camming structure similar to that used with the pump assembly as discussed above).

Figure 15:
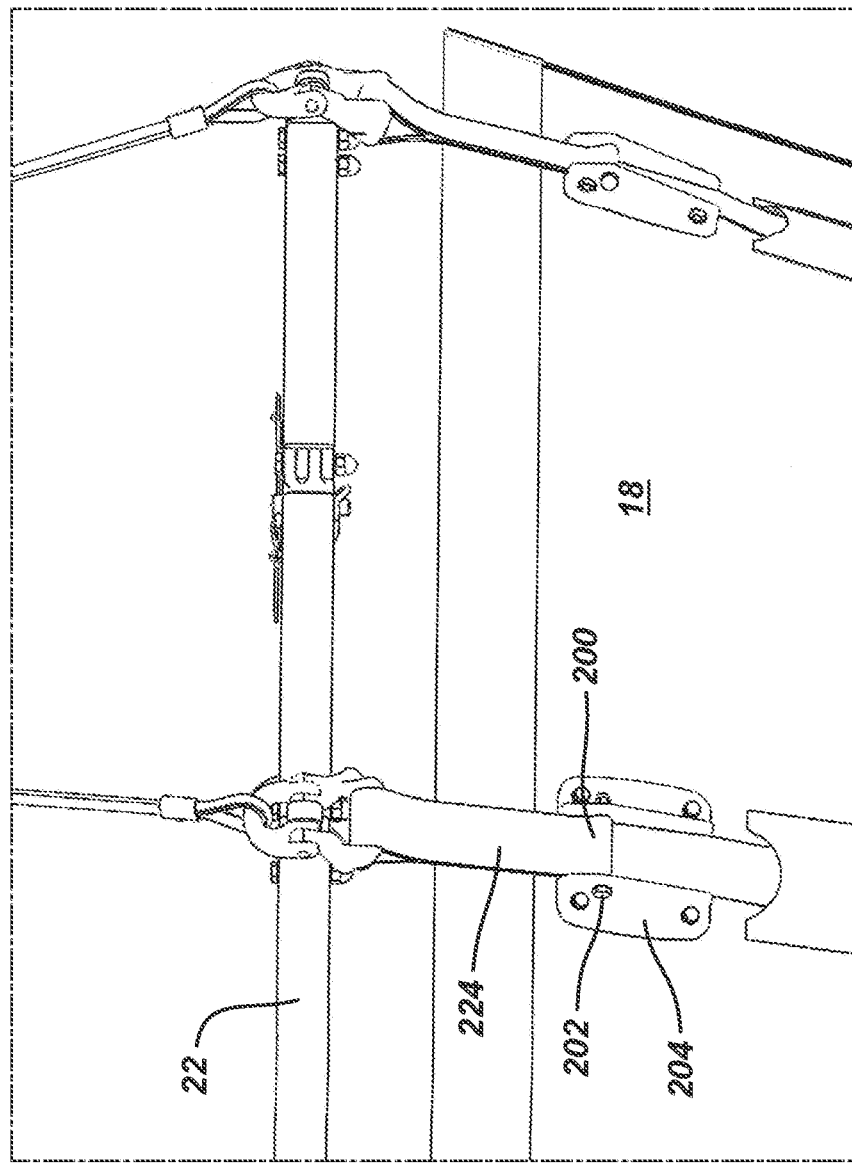
FIG. 15 is a partial perspective view showing an alternate embodiment for attachment of the skin to the upper frame.

Moreover, in another alternative embodiment the skin may be attached to the upper frame 22 as shown in FIG. 15. In this embodiment an additional loop 200 is added to the load strap 224 just below the upper end, to which the skin is attached via a clevis fitting. The clevis fitting includes a clevis pin 202 mounted on the skin by a support 204 that is bolted to the skin via a backing plate and reinforcing layers (not shown). The support 204 includes a vertical central channel that receives and guides the loop 200 while allowing movement to reduce stress on the skin. The clevis pin 202 extends through the loop 200 and is wide enough for the strap to fit within the channel in support 204. In this embodiment the load strap is still easily removable simply by removing the clevis pin 202.

Figure 16:
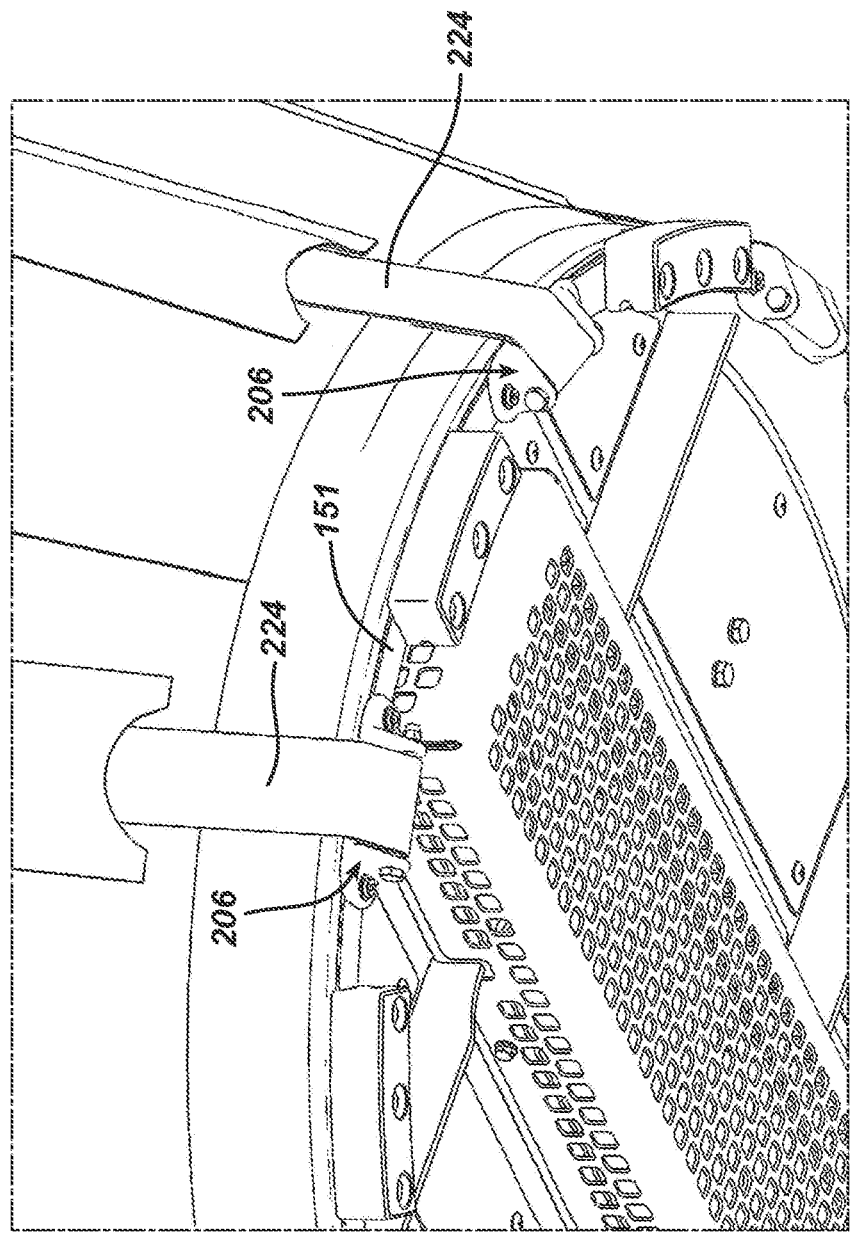
FIG. 16 is a partial perspective view showing an alternate embodiment for attachment of the skin to the upper base ring.

Similarly, as shown in FIG. 16 the lower end of each load strap 224 can be attached to a lower surface 151 of the upper base ring 51 (FIG. 2A) by a clevis fitting 206, replacing the load strap rail 65.

The load straps in the embodiment shown in FIGS. 15 and 16 remain individually replaceable without greater disassembly of the bucket/base, and allow the load strap movement relative to the skin to reduce stresses.

Accordingly, other embodiments are within the scope of the following claims.

What is claimed is:

1. An aerial fire-fighting bucket system comprising:
a bucket configured to be filled with a liquid cargo and to discharge the liquid cargo; and
rigging attached to the bucket and configured to be attached to the long line of an aircraft;
wherein the bucket includes:
a pliable skin having an upper edge and a lower edge,
a generally circular upper frame from which the upper edge of the skin is suspended by a plurality of loops, the upper edge being spaced from the upper frame and the loops providing a sliding connection to the upper frame that allows the skin to slide along a circumference of the generally circular upper frame in response to forces applied to the bucket, and
a lower structure to which the lower edge of the skin is attached in a sealed manner.

2. The aerial fire-fighting bucket system of claim 1, wherein the skin includes a plurality of sleeves disposed on an outer surface of the skin, and the bucket further includes a plurality of vertical load straps that are fixedly attached to the upper frame and the lower structure and extend through the sleeves such that they are slidable relative to the skin.

3. The aerial fire-fighting bucket system of claim 2, wherein the vertical load straps are formed of webbing.

4. The aerial fire-fighting bucket system of claim 2, wherein the rigging comprises a plurality of cables having lower ends, and the vertical load straps are attached to the lower ends of the cables by pivoting knuckle joints.

5. The aerial fire-fighting bucket system of claim 4, wherein each knuckle joint comprises an upper shackle configured to be attached to the lower end of the cable, a lower connector configured to be attached to an upper end of one of the vertical load straps, and a pin connecting the upper shackle and lower connector.

6. The aerial fire-fighting bucket system of claim 4, further comprising removable knuckle joint covers configured to protect the knuckle joints from abrasion.

7. The aerial fire-fighting bucket system of claim 2 wherein lower ends of the vertical load straps include loops that are joined to the lower structure by attaching them to a circular load strap rail mounted on the lower structure.

8. The aerial fire-fighting bucket system of claim 7 wherein the circular load strap rail is configured to be openable by a user to allow the loops to be threaded onto or removed from the circular load strap rail.

9. The aerial fire-fighting bucket system of claim 7 wherein the lower edge of the skin is attached to the lower structure using a band clamp and the vertical load straps are disposed outside of the band clamp so that it is not necessary to remove the band clamp to replace a strap.

10. The aerial fire-fighting bucket system of claim 2 wherein an upper portion of each vertical load strap is removably secured to the skin by a clevis pin.

11. The aerial fire-fighting bucket system of claim 1, wherein the loops include a flexible strap and a buckle configured to allow a user to remove the skin from the upper frame.

12. The aerial fire-fighting bucket system of claim 1 wherein the lower edge of the skin is attached to the lower structure using a band clamp, thereby allowing removal of the skin from the lower structure by a user.

13. The aerial fire-fighting bucket system of claim 12 wherein the lower structure includes a base ring and metal rings mounted on the base ring such that, in combination with an outward-facing surface of the base ring, the metal rings form a groove configured to receive and locate a lower edge of the skin.

14. The aerial fire-fighting bucket system of claim 1 wherein the lower structure comprises a system platform and a valve plate mounted on the system platform.

15. The aerial fire-fighting bucket system of claim 14 wherein the valve plate comprises a pair of flapper valves configured to move from an open position, in which water can enter and leave the bucket, and a close position in which water is retained in the bucket.

16. The aerial fire-fighting bucket system of claim 15 wherein each flapper valve of the valve plate comprises an inner valve plate and an outer valve plate joined by a flexible elastomeric hinge.

17. The aerial fire-fighting bucket system of claim 1 wherein the upper frame is formed of a plurality of elongated rigid members that are pinned together with removable pins and fixed pins.

18. The aerial fire-fighting bucket system of claim 17 wherein the elongated members hinge about the fixed pins when the removable pins are removed, allowing the upper frame to be folded for storage and transport.

19. The aerial fire-fighting bucket system of claim 1 wherein the skin is formed of a urethane-coated fabric having a weight of less than 70 oz/yard$^2$.

* * * * *